(12) United States Patent
Ezawa et al.

(10) Patent No.: US 7,188,349 B2
(45) Date of Patent: Mar. 6, 2007

(54) OPTICAL DISK DEVICE

(75) Inventors: Kozo Ezawa, Hirakata (JP); Takeo Santo, Hirakata (JP); Yoshito Saji, Ashiya (JP); Teruyuki Takizawa, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 569 days.

(21) Appl. No.: 10/491,476

(22) PCT Filed: Oct. 2, 2002

(86) PCT No.: PCT/JP02/10307

§ 371 (c)(1),
(2), (4) Date: Apr. 1, 2004

(87) PCT Pub. No.: WO03/032303

PCT Pub. Date: Apr. 17, 2003

(65) Prior Publication Data

US 2004/0216152 A1 Oct. 28, 2004

(30) Foreign Application Priority Data

Oct. 3, 2001 (JP) ............................ 2001-307248

(51) Int. Cl.
*G11B 7/085* (2006.01)
(52) U.S. Cl. .................................. 720/669
(58) Field of Classification Search ................ 720/669, 720/670
See application file for complete search history.

(56) References Cited

U.S. PATENT DOCUMENTS 5,666,462 A * 9/1997 Park ........................ 386/125

| | | | |
|---|---|---|---|
| 5,729,522 A | 3/1998 | Akama et al. |
| 5,978,347 A | 11/1999 | Akama et al. |
| 6,175,545 B1 | 1/2001 | Akama et al. |
| 6,188,665 B1 | 2/2001 | Furusawa |

FOREIGN PATENT DOCUMENTS

| JP | 2-11548 U | 1/1990 |
|---|---|---|
| JP | 08-297909 A | 11/1996 |
| JP | 09-017155 A | 1/1997 |
| JP | 09-017157 A | 1/1997 |
| JP | 09-259514 A | 10/1997 |

* cited by examiner

*Primary Examiner*—David Davis
(74) *Attorney, Agent, or Firm*—Akin Gump Strauss Hauer & Feld, LLP

(57) ABSTRACT

An optical disc apparatus according to the present invention is equipped with a disc rotation mechanism for placing and rotating a disc, a plurality of optical heads for emitting light beams for recording and/or reproducing data on the optical disc, a transport unit including a guide structure for guiding the optical heads to be radially transportable on the disc, an optical head transport mechanism for transporting the optical heads along the guide structure, and a transport base for supporting the disc rotation mechanism, the guide structure and the optical head transport mechanism, an optical head storing portion having a plurality of storage support guides for supporting and storing each of the plurality of optical heads, and an optical head insertion and removal mechanism for transporting each of the optical heads from the optical head storing portion to the transport unit or from the transport unit to the optical head storing portion, and each optical head stored in the optical head storing portion is transported to the transport unit by linearly moving from a position at which it is stored.

33 Claims, 28 Drawing Sheets

(2 4)

(2 4)

OPTICAL DISK DEVICE

CROSS-REFERENCE TO RELATED APPLICATIONS

This application is a Section 371 of International Application No. PCT/JP02/10307, filed Oct. 2, 2002, under International Publication No. WO 03/032303 A1, the disclosure of which is incorporated herein by reference.

TECHNICAL FIELD

The present invention relates to an optical disc apparatus comprising a plurality of optical heads for recording and/or reproducing data on an optical disc.

BACKGROUND ART

Disc-form recording media (hereafter, referred to as discs) of a plurality of standards such as a CD (Compact Disc) and a DVD (Digital Versatile Disc) have become widespread. Because these discs have different recording densities, and so wavelengths of light beams used for recording and/or reproduction are different. There are the discs of the same recording density but having different recording and reproduction formats such as reproduction-only, recordable, rewritable, and the like, wherein different recording and reproduction methods are adopted. For this reason, various optical disc apparatuses are used such that the differences in recording densities and recording and reproduction methods are accommodated.

In the case where the optical disc apparatus supports the discs of only one recording density, and one recording and reproduction method, a user must prepare the optical disc apparatus for each disc type. To resolve such inconvenience, there is a demand for the optical disc apparatus supporting a plurality of disc types.

From a viewpoint of miniaturizing the optical disc apparatus, it is ideal that the optical disc apparatus supporting a plurality of disc types comprises one optical head ready for various recording densities and recording and reproduction methods. However, because the wavelengths of the light beams used for recording and/or reproduction are different depending on the recording density, such an optical disc apparatus needs to comprise a plurality of light emitting elements for emitting the light beams. And the discs have different optical systems depending on the standards and the recording and reproduction methods thereof. For this reason, it is difficult to place a plurality of light emitting elements and a plurality of optical systems in one optical head in order to satisfy characteristics necessary for the respective elements and optical systems. In particular, when securing sufficient space required to keep reliability of the characteristics necessary for the respective elements and optical systems, it is difficult to constitute them in one optical head.

For this reason, dividing the optical heads for each wavelength of the light beam or the optical system and recording and/or reproducing the data on a corresponding disc by using each of the plurality of heads enable to make dimensions of each optical head smaller and secure the reliability thereof. Manufacturing and adjustment costs and component costs can also be reduced.

On the other hand, there are many cases where the discs have almost the same outer shape in general although they have different recording densities and recording and reproduction methods, as described above. Therefore, as for the optical disc apparatus supporting a plurality of disc types, it is desirable, from the viewpoint of arrangement space and apparatus costs, to render the elements and structure other than the optical head as common as possible.

Considering these points, it is preferable that the optical disc apparatus capable of recording and/or reproduction on a variety of optical discs have the plurality of optical heads supporting the discs and the commonly used structure other than the optical head.

As for such an optical disc apparatus, Japanese Patent No. 2943918 discloses the optical disc apparatus comprising a plurality of optical heads and one optical disc rotation mechanism. This optical disc apparatus will be described hereafter. As shown in FIG. 37, this optical disc apparatus comprises a first optical head 501$a$ and a second optical head 502$b$ supporting the optical disc capable of recording and/or reproduction, first small guide shafts 502$a$L, 502$a$R and second small guide shafts 502$b$L, 502$b$R for supporting the first optical head 501$a$ and second optical head 501$b$ on storage respectively, and an optical head storing portion 551 having a turntable 503 and a support 504.

The turntable 503 is rotatably supported about a rotative spindle 503A relative to the support 504, and is rotated in the direction of an arrow 801 by a rotative mechanism not shown. The first small guide shafts 502$a$L, 502$a$R and second small guide shafts 502$b$L, 502$b$R are placed to be mutually parallel. And the distance from a plane surface including the first small guide shafts 502$a$L, 502$a$R to the rotative spindle 503A is set to be equal to the distance from the plane surface including the second small guide shafts 502$b$L, 502$b$R to the rotative spindle 503A.

An optical disc 505 is driven by a disc motor 506. When recording and/or reproducing on the optical disc 505, the first optical head 501$a$ or second optical head 501$b$ is radially guided on the optical disc 505 by guide shafts 507L and 507R. The disc motor 506, guide shafts 507L and 507R are integrally supported by a transport base 508. And both the support 504 and transport base 508 are supported by a base 509. The first optical head 501$a$ or second optical head 501$b$ is transported along the guide shafts 507L and 507R by a transport drive (not shown) so as to record and/or reproduce the data by radially scanning the optical disc 505.

The first optical head 501$a$ or second optical head 501$b$ are stored in the optical head storing portion 551 in a state of being supported by the small guide shafts 502$a$L, 502$a$R and 502$b$L, 502$b$R respectively so that their respective objective lenses 501$a$A and 501$b$A are mutually opposed. In FIG. 37, the small guide shaft 502$a$L and the guide shaft 507L, and the small guide shaft 502$a$R and the guide shaft 507R are placed in alignment. In this state, the first optical head 501$a$ can be moved from the optical head storing portion 551 to the transport base 508 in the direction of an arrow 802. If the first optical head 501$a$ is inserted into the guide shafts 507L and 507R of the transport base 508, the first optical head 501$a$ records and/or reproduces the data on the optical disc 505 while moving along the guide shafts 507L and 507R.

If the turntable 503 is rotated 180 degrees in any of the directions of the arrow 801 by the rotative mechanism (not shown), the small guide shafts 502$b$R and the guide shaft 507L, and the small guide shafts 502$b$L and the guide shaft 507R are placed in alignment. In this state, the second optical head 501$b$ can be moved from the optical head storing portion 551 to the transport base 508 in the direction of an arrow 802. If the second optical head 501$b$ is inserted into the guide shafts 507L and 507R of the transport base 508, the second optical head 501b records and/or reproduces the data on the optical disc 505 while moving along the guide shafts 507L and 507R.

When replacing the optical head, the above-mentioned procedure is inversely performed. In particular, one of the first optical head 501a and second optical head 501b on the transport base 508 is returned to the optical head storing portion 551, and the turntable 503 is rotated 180 degrees. Thereafter, the other optical head is moved to the transport base 508. The optical head is replaced in the case where the optical head on the transport base 508 is not corresponding to the type of the optical disc 505 placed on the disc motor 506. For instance, it includes the case where, as a result of detecting the type of the optical disc 505 placed on the disc motor 506 with the optical head on the transport base 508, it turns out that the optical head is not capable of the recording and/or reproduction.

As described above, this optical disc apparatus requires the turntable 503 to be rotated 180 degrees in the case of replacing the optical head or mounting the optical head not adjacent to the guide shafts 507L and 507R of the transport base 508. For this reason, where W is a larger value of a width Wa or Wb of the first optical head 501a or the second optical head 501b on the surface orthogonal to the rotative spindle 503A of the turntable 503, a height H of the optical head storing portion 551 needs to be at least larger than W. This represents a problem that the height of the optical disc apparatus is restricted by the width of the first optical head 501a or the second optical head 501b and the height of the optical disc apparatus cannot be smaller than W.

A flexible cable 510a such as an FPC (flexible print cable) or an FFC (flexible flat cable) is used for a feeder line and a signal line to the first optical head 501a and the second optical head 501b. For instance, as shown in FIG. 38, the flexible cable 510a is connected to the first optical head 501a, and the flexible cable 510a is curved to the back side of the objective lens 501A. Or else, as shown in FIG. 39, the flexible cable 510a is curved to the objective lens 501A side. And one end of the flexible cable 510a not connected to the first optical head 501a is connected to a printed board not shown by a connector or the like.

In this case, even if the first optical head 501a moves in the direction of an arrow 803 or 804 shown in FIGS. 38 and 39, the flexible cable 510a can be reasonably curved. For this reason, when the first optical head 501a and the second optical head 501b are transported on the guide shafts 507L and 507R, the flexible cable 510a is reasonably curved.

When rotating the first optical head 501a in the direction of an arrow 805 or 806, a force that prevents the flexible cable 510a from being curved is exerted. For this reason, there arises a problem that, in the case where the optical head storing portion 551 is rotated in the direction of the arrow 801 shown in FIG. 37 in the state of having the first optical head 501a and the second optical head 501b stored therein, the flexible cable 510a cannot be adequately curved so that the flexible cable 510a gets damaged or a great force is exerted on a connection between the flexible cable 510a and the first optical head 501a or the connection between the flexible cable 510a and the printed board not shown to destroy the connection.

DISCLOSURE OF INVENTION

It is an object of the present invention to solve the above conventional problem and provide the optical disc apparatus capable of reducing the height of the entire apparatus and connecting the feeder line and the signal line so as not to exert an unreasonable force on a plurality of optical heads.

The optical disc apparatus according to the present invention, comprises: a disc rotation mechanism for placing and rotating a disc; a plurality of optical heads for emitting light beams for recording and/or reproducing data on the optical disc; a transport unit including a guide structure for guiding the optical heads to be radially transportable on the disc, an optical head transport mechanism for transporting the optical heads along the guide structure, and a transport base for supporting the disc rotation mechanism, the guide structure and the optical head transport mechanism; an optical head storing portion having a plurality of storage support guides for supporting and storing each of the plurality of optical heads; and an optical head insertion and removal mechanism for transporting each of the optical heads from the optical head storing portion to the transport unit or from the transport unit to the optical head storing portion, and wherein each optical head stored in the optical head storing portion is transported to the transport unit by linearly moving from a position at which it is stored.

In one preferred embodiment, the plurality of optical heads are stored in the optical head storing portion in an attitude to emit the light beams respectively in the same direction.

In one preferred embodiment, the storage support guides are vertically arranged so that an optical axis of light beams emitted from the plurality of optical heads supported by the storage support guides and a rotation axis of a disc rotation mechanism are substantially on the same plane in the optical head storing portion.

In one preferred embodiment, the apparatus records and/or reproduces data on the optical disc placed on the disc rotation mechanism in a state of having relative positions of the optical head storing portion and the transport unit set up in order to insert one of the plurality of optical heads stored in the optical head storing portion into the transport unit.

In one preferred embodiment, the optical head insertion and removal mechanism is provided to the transport unit, and the optical head insertion and removal mechanism and the optical head transport mechanism share a single driving source.

In one preferred embodiment, each of the plurality of optical heads has a transport rack having a tooth form of a tooth trace in a direction orthogonal to a direction guided by the guide structure, and each of the optical head insertion and removal mechanism and the optical head transport mechanism has an insertion gear and a transport gear capable of engaging with the transport rack of each optical head, and in the case where the transport unit and the optical head storing portion are at the positions capable of inserting or ejecting one of the plurality of optical heads stored in the optical head storing portion, the transport rack of the one optical head engages with the insertion gear and the one optical head is inserted into the transport unit from the optical head storing portion so that, in the transport unit, the transport rack of the one optical head engages with the transport gear so as to transport the one optical head along the guide structure.

In one preferred embodiment, a rotation center of at least one of the insertion gear and transport gear swings to change a distance from the transport rack of the optical head, and the optical head insertion and removal mechanism or the optical head transport mechanism has a gear forcing mechanism for, of the insertion gear or the transport gear, forcing the gear of which rotation center swings to the transport rack side.

In one preferred embodiment, the optical head insertion and removal mechanism or the optical head transport mechanism has a preliminary gear for driving the swinging gear, and the swinging gear swings by using the rotation center of the preliminary gear as a spindle.

In one preferred embodiment, the plurality of optical heads include a first optical head and a second optical head, and the plurality of storage support guides of the optical head storing portion include a first storage support guide and a second storage support guide for supporting the first optical head and second optical head, where the first storage support guide is positioned higher than the second storage support guide.

In one preferred embodiment, the optical disc apparatus further comprises a transport unit elevator for moving the transport unit to a first position and a second position so that the first optical head is transported from the optical head storing portion to the transport unit or from the transport unit to the optical head storing portion at the first position, and the second optical head is transported from the optical head storing portion to the transport unit or from the transport unit to the optical head storing portion at the second position.

In one preferred embodiment, recording and/or reproducing data on the optical disc placed on the disc rotation mechanism are performed when the transport unit is at the first position.

In one preferred embodiment, the first optical head and the second optical head have objective lenses respectively, and a numerical aperture of the objective lens of the second optical head is larger than that of the objective lens of the first optical head.

In one preferred embodiment, the optical head insertion and removal mechanism is provided to the transport unit, and the optical head insertion and removal mechanism and the optical head transport mechanism share a single driving source.

In one preferred embodiment, each of the first and second optical heads has a transport rack having a tooth form of a tooth trace in a direction orthogonal to the direction guided by the guide structure, and each of the optical head insertion and removal mechanism and the optical head transport mechanism has an insertion gear and a transport gear capable of engaging with the transport rack of each optical head, and in the case where the, transport unit and the optical head storing portion are at the positions capable of inserting or ejecting one of the plurality of optical heads stored in the optical head storing portion, the transport rack of the one optical head engages with the insertion gear and the one optical head is inserted into the transport unit from the optical head storing portion so that, in the transport unit, the transport rack of the one optical head engages with the transport gear so as to transport the one optical head along the guide structure.

In one preferred embodiment, a rotation center of at least one of the insertion gear and transport gear swings to change a distance from the transport rack of the optical head, and the optical head insertion and removal mechanism or the optical head transport mechanism has a gear forcing mechanism for, of the insertion gear and transport gear, forcing the gear of which rotation center swings to the transport rack side.

In one preferred embodiment, the optical head insertion and removal mechanism or the optical head transport mechanism has a preliminary gear for driving the swinging gear, and the swinging gear swings by using the rotation center of the preliminary gear as a spindle.

In one preferred embodiment, the optical disc apparatus further comprises an engagement avoiding mechanism in which, when the second optical head is inserted into the transport unit, the transport unit swings the insertion gear at the first position so as not to engage the transport rack of the first optical head stored in the optical head storing portion with the insertion gear.

In one preferred embodiment, the optical head insertion and removal mechanism has an forcing portion for swinging the insertion gear, and the engagement avoiding mechanism has an engagement avoiding lever for forcing the forcing portion of the optical head insertion and removal mechanism in the case where the second optical head does not exist in the optical head storing portion and contacting the second optical head in the case where the second optical head is in the optical head storing portion so as to move the forcing portion of the optical head insertion and removal mechanism without forcing it.

In one preferred embodiment, at least one of the plurality of optical heads has an adapter having a guide receiving portion for engaging with the guide structure and an optical pickup placed on the adapter and having the guide receiving portion which does not engage with at least a part of the guide structure.

In one preferred embodiment, the adapter has a mechanism for adjusting the position of the optical pickup against the adapter in order to adjust an optical axis of light beams emitted from the optical pickup.

In one preferred embodiment, the optical pickup comprises a first projection and a pair of second projections, and the mechanism for adjusting the position of the optical pickup includes forcing springs for forcing each of the first projection and pair of second projections to the adapter and adjustment screws for pushing up the first projection and pair of second projections from the adapter against the forcing springs respectively.

In one preferred embodiment, the optical pickup comprises a first projection and a pair of second projections, and the mechanism for adjusting the position of the optical pickup includes forcing springs for forcing each of the first projection and pair of second projections to the adapter, adjustment screws for pushing up the first projection and one of the pair of second projections from the adapter against the forcing springs respectively, and a convex portion positioned around in the middle of the pair of second projections and provided to the adapter to contact the bottom face of the optical pickup.

In one preferred embodiment, the optical disc apparatus further comprises an optical headlock mechanism for preventing at least one of the plurality of optical heads stored in the optical head storing portion from moving from a corresponding storage support guide.

In one preferred embodiment, the optical headlock mechanism independently prevents each of the plurality of optical heads from moving, and prevents all the optical heads from moving in the case where the transport unit and the optical head storing portion are at the positions for transporting no optical head.

In one preferred embodiment, the insertion gear swings in conjunction with a transport unit elevator.

In one preferred embodiment, the optical disc apparatus further comprises a mechanism for absorbing a phase difference between the insertion gear and the transport gear.

In one preferred embodiment, the plurality of optical head transport racks have gear teeth of which tooth depth becomes larger in stages from an edge to the center at least in the neighborhood of one end and reaches a normal tooth depth at the center.

In one preferred embodiment, the second optical head has a portion for emitting the light beams formed in a convex portion, and the first optical head has a concave portion for receiving at least a part of the convex portion of the second optical head when the first optical head and the second optical head are stored in the optical head storing portion.

In one preferred embodiment, the guide structure, the first storage support guide and second storage support guide are pairs of parallel shafts placed with equal space respectively so that the shaft of the guide structure and the shaft of the first storage support guide, and the shaft of the guide structure and the shaft of the second storage support guide are placed to be linear at the first position and the second position respectively.

In one preferred embodiment, the first optical head and the second optical head have a pair of guide receiving portions for engaging with the shafts, and lengths the pairs of shafts of the guide structure, the first storage support guide and second storage support guide are different so that, when the first optical head and the second optical head are transported from the first storage support guide or the second storage support guide to the guide configuration, one of the pair of guide receiving portions is supported by the first storage support guide or the second storage support guide until the other of the pair of guide receiving portions is completely moved to the guide structure.

In one preferred embodiment, an area in which the insertion gear engages with the transport rack is different from the area in which the transport gear engages with the transport rack.

In one preferred embodiment, the area in which the transport rack engages with the insertion gear and the area in which it engages with the transport gear are comprised of independent components.

In one preferred embodiment, the optical disc apparatus further comprises an forcing means with a rolling contact portion or a sliding contact portion for causing a surface having no gear of the transport rack to contact with the rolling contact portion or sliding contact portion and forcing the transport rack in the direction of the insertion gear or the transport gear, wherein the transport rack has a degree of freedom for moving in the direction orthogonal to the guiding direction of the optical head.

BEST MODE FOR CARRYING OUT THE INVENTION

Figure 1:
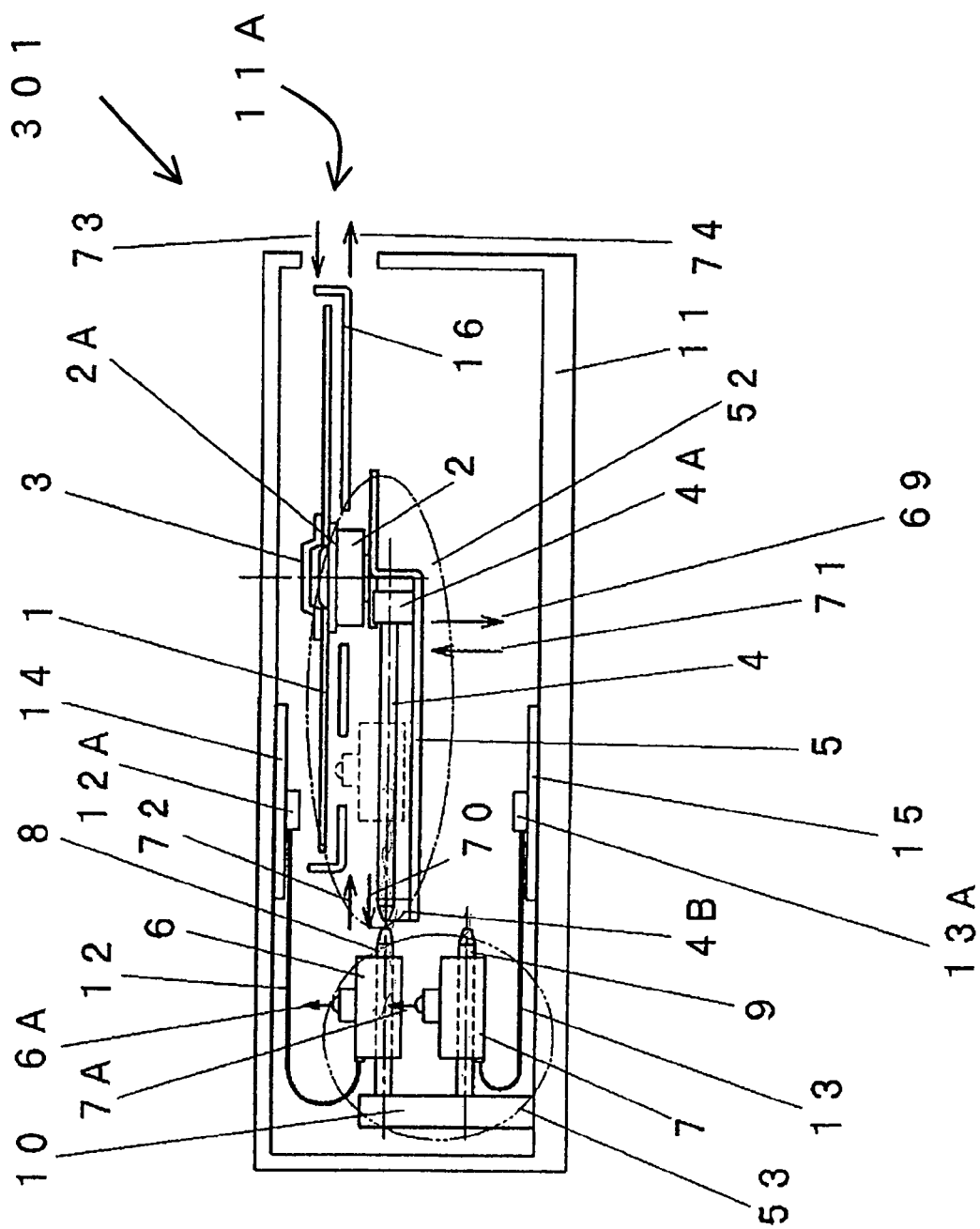
FIG. 1 is a sectional view schematically showing an embodiment of an optical disc apparatus according to the present invention.

Hereafter, an embodiment of an optical disc apparatus according to the present invention will be described by referring to the drawings.

FIG. 1 is a sectional view conceptually showing overall structure of an optical disc apparatus 301. The optical disc apparatus 301 comprises a disc motor 2 as a disc rotation mechanism, a first optical head 6, a second optical head 7, a transport unit 52 and an optical head storing portion 53. An optical disc 1 is placed on a turntable 2A for rotating integrally with a rotor of the disc motor 2, and is chucked by a clamper 3.

The transport unit 52 includes a guide structure 4 comprised of a transport base 5 and a pair of shafts. The guide structure 4 performs guidance for transporting the first optical head 6 or the second optical head 7 radially on the optical disc 1. FIG. 1 shows a state in which the first optical head 6 and the second optical head 7 are not inserted into the guide structure 4. Each guide structure 4 is supported on the transport base 5 by supporting members 4A and 4B. The disc motor 2 is supported on the transport base 5.

The first optical head 6 and the second optical head 7 may be either the ones for the optical discs of different recording densities or recording and reproduction methods or the same ones. In the case where the first optical head 6 and second optical head 7 are the same, it is possible to use the first optical head 6 normally and regard the second optical head 7 as a standby optical head, for instance. In the case where the two optical heads are intended to record and/or reproduce on the optical discs 1 of different recording densities or recording and reproduction methods, it is possible, for instance, to use the first optical head 6 as the optical head for low-density recording and reproduction for emitting light of a long wavelength and use the second optical head 7 as the optical head for high-density recording and reproduction for emitting light of a short wavelength. When denoting both the first optical head 6 and the second optical head 7, they may be referred to merely as the optical heads in the following description.

The first optical head 6 and the second optical head 7 are electrically connected to one ends of a first flat cable 12 and a second flat cable 13 collectively bundling feeder lines and signal lines. The other ends of these flat cables are connected to a first connector 12A of a first printed board 14 and a second connector 13A of a second printed board 15 respectively.

The optical head storing portion 53 has a first storage support guide 8 and a second storage support guide 9 provided below the first storage support guide 8, each of them comprised of a pair of shafts, and a storage support base 10 for supporting them. The first storage support guide 8 and the second storage support guide 9 support and store the first optical head 6 and the second optical head 7 respectively. FIG. 1 shows a state of the first optical head 6 and the second optical head 7 stored in the optical head storing portion 53. In FIG. 1, arrows 6A and 7A indicate directions of light beams emitted from the first optical head 6 and the second optical head 7. As shown in FIG. 1, the first optical head 6 and the second optical head 7 are stored in the optical head storing portion 53 so as to emit the light beams in the same direction. To be more specific, the first optical head 6 and the second optical head 7 are stored in the optical head storing portion 53 in a position to have the light beams emitted from each of them in the same direction.

The first optical head 6 has a configuration capable of engaging with the first storage support guide 8 and the second storage support guide 9 of the optical head storing portion 53 and the guide structure 4 of the transport unit 52 and moving along them. For instance, in the case where the first storage support guide 8, the second storage support guide 9 and the guide structure 4 are two shafts having a circular section, the first optical head 6 comprises two grooves or holes for commonly receiving the first storage support guide 8, the second storage support guide 9 and the guide structure 4.

According to this embodiment, the first storage support guide 8, the second storage support guide 9 and the guide structure 4 have two shafts respectively. However, they may have three or more shafts. The guide structure 4 may be constituted to have one shaft if, when the first optical head 6 and the second optical head 7 move along the guide structure 4, an inclination between an optical axis of the light beams emitted from the first optical head 6 and a data recording surface of the optical disc 1 is constantly kept fixed.

Furthermore, the number of and space between the shafts which the first storage support guide 8, the second storage support guide 9 and the guide structure 4 have may be different. If the guidance on a transport direction is possible, the first storage support guide 8, the second storage support guide 9 and the guide structure 4 may have a guiding structure other than the shafts. In this case, however, the first optical head 6 and the second optical head 7 need to have the structure or guiding structure to receive each shaft.

As indicated by arrows 69 and 71 in FIG. 1, the transport unit 52 is moved up and down by a transport unit elevator (not shown in FIG. 1) described in detail below. At a first position shown in FIG. 1, an optical head insertion/removal and transport mechanism (not shown in FIG. 1) described in detail below moves the first optical head 6 supported by the first storage support guide 8 of the optical head storing portion 53 to the guide structure 4 of the transport unit 52 as indicated by an arrow 72. As indicated by an arrow 70, the optical head insertion/removal and transport mechanism moves the first optical head 6 on the guide structure 4 of the transport unit 52 to the first storage support guide 8 of the optical head storing portion 53.

When the transport unit 52 is at the first position, the optical disc apparatus 301 can record and/or reproduce the data on the optical disc 1. To be more specific, the optical disc 1 is placed on the turntable 2A of the disc motor 2 to rotatively drive the optical disc 1. The first optical head 6 or the second optical head on the guide structure 4 of the transport unit 52 is moved along the guide structure 4 so as to record and/or reproduce the data on the optical disc 1 by moving the first optical head 6 radially on the optical disc 1.

Figure 2:
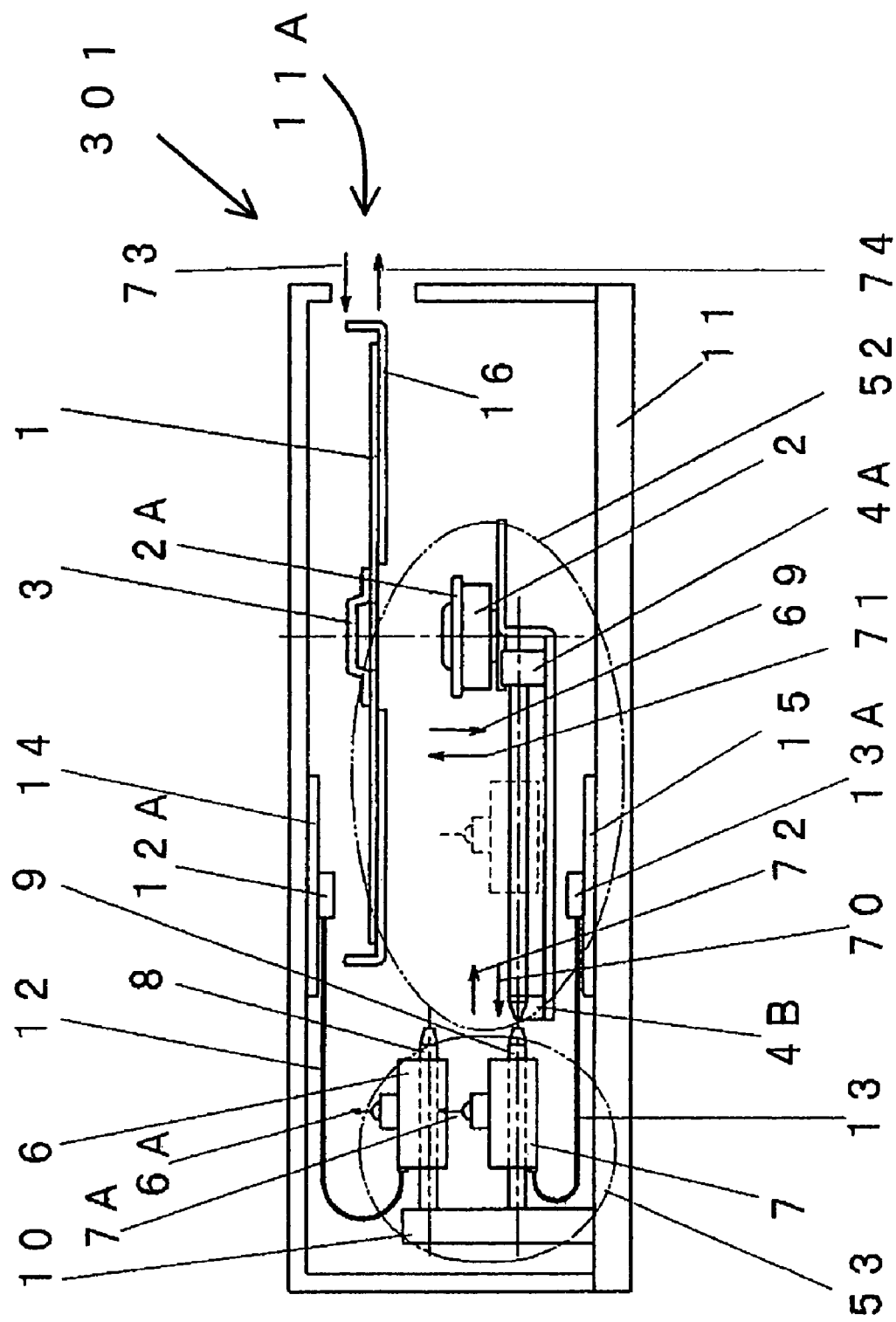
FIG. 2 is another sectional view schematically showing an embodiment of the optical disc apparatus according to the present invention.

In the case where the transport unit 52 is moved to a second position shown in FIG. 2 by the transport unit elevator, the second optical head 7 supported by the second storage support guide 9 of the optical head storing portion 53 is moved to the guide structure 4 of the transport unit 52 as indicated by the arrow 72. As indicated by the arrow 70, the second optical head 7 on the guide structure 4 of the transport unit 52 is also moved to the second storage support guide 9 of the optical head storing portion 53.

The optical disc apparatus 301 further comprises a cabinet 11 and a disc tray 16 to be inserted into and ejected from an opening 11A provided to the cabinet 11. On inserting the optical disc 1 into the apparatus from outside, the disc tray 16 has the optical disc 1 placed thereon and moves in the direction of an arrow 73. On ejecting the optical disc 1 to the outside from inside the apparatus, it carries the optical disc 1 and moves in the direction of an arrow 74. While the disc tray 16 is moving in the direction of the arrow 73 or the arrow 74, the transport unit 52 is at the second position as shown in FIG. 2.

As shown in FIG. 1, if the optical disc 1 placed on the disc tray 16 is inserted into the optical disc apparatus 301, the transport unit 52 ascends in the direction of the arrow 71 so as to sandwich the optical disc 1 between the turntable 2A and the clamper 3. Thus, the optical disc 1 is unified with the turntable 2A to be held rotatable. In particular, it is possible, in sandwiching the optical disc 1 between the turntable 2A and the clamper 3, to constitute the rotor of the disc motor 2 with a magnetic body and incorporate a magnet into the clamper 3 so as to fix the optical disc 1 on the turntable 2A by utilizing attraction due to both magnetic forces. It is also possible to cause the optical disc 1 and the turntable 2A to attract each other without using the clamper 3 by directly fixing the magnetic body on the optical disc 1 and incorporating a magnet into the rotor. And it is also possible to press the optical disc 1 against the turntable 2A with a spring force, etc. of the clamper 3.

FIGS. 1 and 2 show that the optical disc 1 is directly placed on the disc tray 16. However, the optical disc 1 may also be inserted into a cartridge. In this case, the optical disc 1 should be put in the cartridge of which shape is different according to a difference in the recording density or the recording and reproduction method of the optical disc 1. And it is also possible to provide on the disc tray 16 a detector for detecting the difference in the cartridge shape and whether or not the optical disc 1 is put in the cartridge.

Hereafter, a description will be given by referring to FIGS. 1 and 2 as to the procedure for recording and/or reproducing the data on the optical disc 1 by using the first optical head 6 and the second optical head 7 on the optical disc apparatus 301. In the following description, the first optical head 6 and the second optical head 7 record and/or reproduce the data on the first optical disc and the second optical disc having different recording densities. The first optical disc and the second optical disc are normally put in the corresponding first cartridge and second cartridge respectively. It is also possible, however, to have the second optical disc and the first optical disc put in the first cartridge and the second cartridge respectively when the optical disc apparatus 301 is in an initial state or in a standby state, the first optical head 6 and the second optical head 7 are stored in the optical head storing portion 53, and no optical head is mounted on the transport unit 52. The transport unit 52 is at the second position as shown in FIG. 2.

Figure 3:
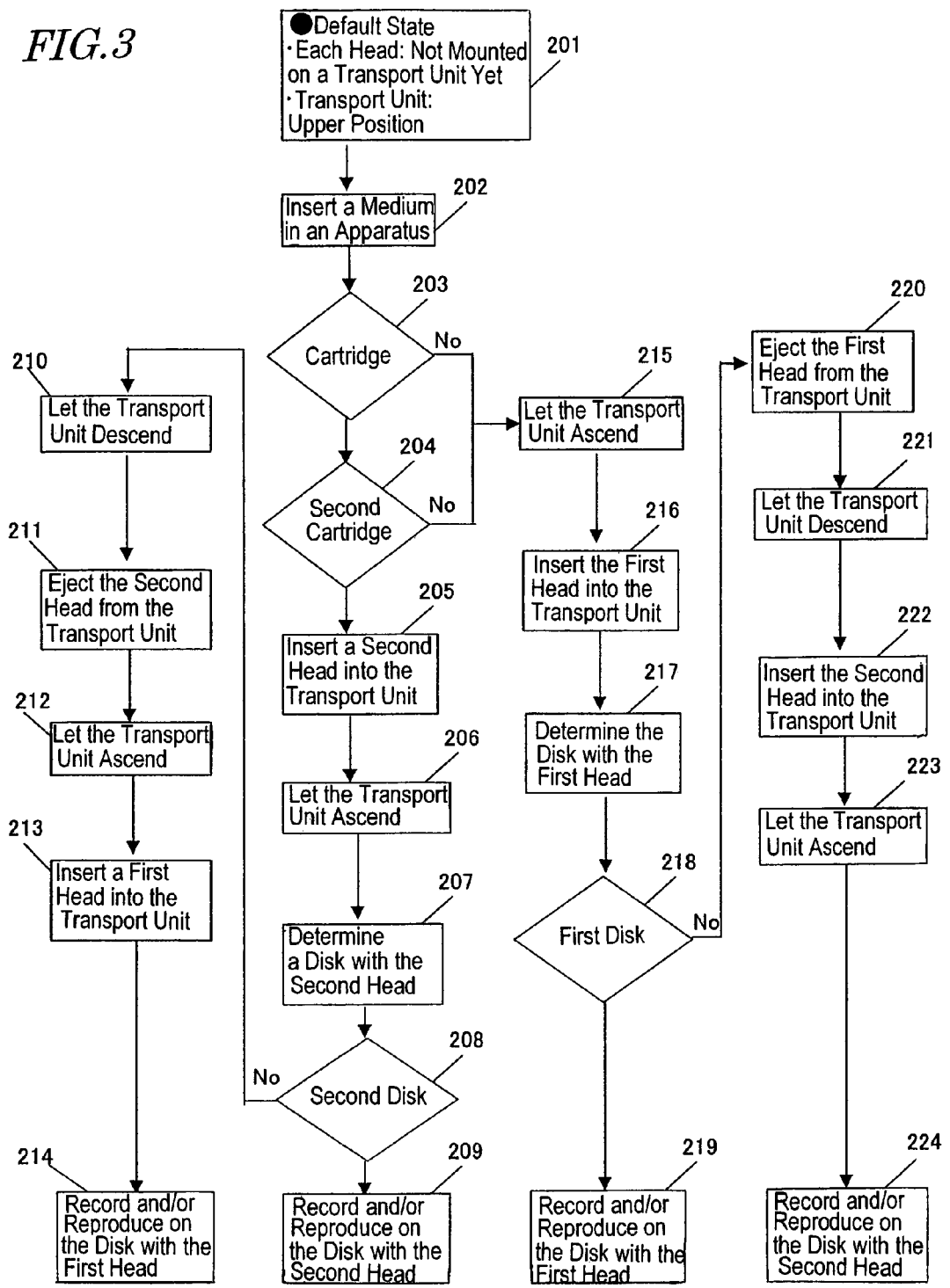
FIG. 3 is a flowchart for describing operation of the optical disc apparatus.

FIG. 3 is a flowchart for describing a control procedure of the optical disc apparatus 301. As described above, the optical disc apparatus 301 is in a state of a step 201. First, if the optical disc put in the cartridge is placed on the disc tray 16 and the disc tray 16 is loaded in the optical disc apparatus 301 (step 202), a detector provided on the disc tray 16 detects whether or not the optical disc placed on the disc tray 16 is put in the cartridge (step 203). It further detects whether or not the cartridge is the second cartridge (step 204). If determined that it is the second cartridge 7, it moves the second optical head 7 from the optical head storing portion 53 to the transport unit 52, and causes the transport unit 52 to ascend according to the arrow 71 (step 206).

If the transport unit 52 ascends and reaches the first position, the optical disc in the cartridge is placed on the turntable 2A. Thus, it becomes possible to record and/or reproduce the data on the optical disc by using the second optical head 7. It is determined whether or not the optical disc is the second optical disc by irradiating the light beams from the second optical head 7 (step 208). In the case where the optical disc is the second optical disc, the second optical head 7 is continuously used to record and/or reproduce the data on the optical disc (step 209).

In the case where the optical disc is not the second optical disc as a result of the determination by using the second optical head 7, the transport unit 52 is caused to descend to the second position as indicated by an arrow 69 (step 210). At this time, the optical disc is detached from the turntable 2A as the transport unit 52 descends. After moving the second optical head 7 from the transport unit 52 to the optical head storing portion 53 (step 211), the transport unit 52 is caused to ascend to the first position (step 212).

If the transport unit 52 ascends and reaches the first position, the optical disc in the cartridge is placed on the turntable 2A again. Subsequently, the first optical head 6 is moved from the optical head storing portion 53 to the transport unit 52 (step 213). Thus, it becomes possible to record and/or reproduce the data on the optical disc by using the first optical head 6 (step 214).

In the case where the optical disc placed on the disc tray 16 is not put in the cartridge or the optical disc is put in the first cartridge (step 203), the transport unit 52 is caused to ascend to the first position (step 215). If the transport unit 52 ascends and reaches the first position, the optical disc in the cartridge is placed on the turntable 2A again. Subsequently, the first optical head 6 is moved from the optical head storing portion 53 to the transport unit 52 (step 216). Thus, it becomes possible to record and/or reproduce the data on the optical disc by using the first optical head 6.

It is determined whether or not the optical disc is the first optical disc by irradiating the light beams from the first optical head 6 to the optical disc (step 217). If the optical disc is the first optical disc, the first optical head 6 is continuously used to record and/or reproduce the data on the optical disc (step 219).

On the other hand, if the optical disc is not the first optical disc as a result of the determination by using the first optical head 6, the first optical head 6 is moved to the optical head storing portion 53 (step 220). Thereafter, the transport unit 52 is caused to descend to the second position as indicated by the arrow 69 (step 221). At this time, the optical disc is detached from the turntable 2A as the transport unit 52 descends. After moving the second optical head 7 from the optical head storing portion 53 to the transport unit 52 at the second position (step 222), the transport unit 52 is caused to ascend to the first position again (step 223). If the transport unit 52 ascends and reaches the first position, the optical disc in the cartridge is placed on the turntable 2A again. Thus, it becomes possible to record and/or reproduce the data on the optical disc by using the second optical head 7 (step 224).

Thus, according to the optical disc apparatus 301, the first optical head 6 and the second optical head 7 stored in the optical head storing portion 53 are inserted into the guide structure 4 of the transport unit 52 in the same direction as when stored in the optical head storing portion 53 so as to record and/or reproduce the data on the optical disc 1. To be more specific, in the optical disc apparatus 301, the first optical head 6 and the second optical head 7 only perform linear motion and do not perform rotary motion such as rotation or revolution. For this reason, no force for twisting the flat cables 12 and 13 connected to the first optical head 6 and the second optical head 7 or keeping them from being adequately curved is exerted on the flat cables 12 and 13. Therefore, it is possible to prevent the flat cables 12 and 13 and the connections at both ends thereof from being damaged.

As the optical head storing portion 53 does not rotate, width of a surface parallel with the optical disc of the optical head does not influence height of the optical head storing portion 53 or the height of the optical disc apparatus 301. For this reason, it is possible to reduce the height of the optical disc apparatus 301 without being limited by the width of the optical head.

This embodiment has the structure capable of recording and/or reproducing the data on the optical disc 1 when the transport unit 52 is at the first position. It is also possible, however, to record and/or reproduce the data when the transport unit 52 is at another position. For instance, when the transport unit 52 is at the second position as shown in FIG. 2, the disc tray 16 having the optical disc placed thereon may descend to record and/or reproduce the data. It is also possible to record and/or reproduce the data when the transport unit 52 is at a position other than the first and second positions. However, it is feasible to record and/or reproduce the data at the first position or the second position for moving the optical head between the optical head storing portion 53 and the transport unit 52 so as to immediately record and/or reproduce the data just by moving at least one of the optical heads to the transport unit 52. This provides an advantage in that the time interval is short before the optical disc apparatus 301 starts the recording and/or reproduction.

As shown in FIG. 1, a mechanism for moving the disc tray 16 in the directions of the arrows 73, 74 and the arrows 69, 71 is necessary in order to move the disc tray 16 up and down. Such a mechanism is complicated in general. For this reason, it is preferable, for the sake of curbing the manufacturing costs of the optical disc apparatus 301 and improving reliability of the apparatus, to record and/or reproduce the data at the first position as shown in FIG. 1. In this case, the first optical head 6 moves horizontally along the surface parallel with the optical disc 1 from the optical head storing portion 53 to the transport unit 52.

As described above, consideration is given to the case where the first optical head 6 and the second optical head 7 are corresponding to the optical discs of different recording densities on recording and/or reproducing the data at the first position.

In general, if the recording density of the optical disc becomes higher, an NA (numerical aperture) of the objective lens provided to the optical head for recording and/or reproducing on the optical disc becomes larger, and a distance (working distance) between the optical disc and the objective lens of the optical head also becomes shorter. A cartridge for accommodating the optical disc has a structure for securing the working distance of the optical head corresponding to the accommodated optical disc. In particular, a through-thickness structure of the disc such as a side surface, etc. of the cartridge is designed not to contact the objective lens of the optical head in a movement area of the optical head. For this reason, if a comparison is made between a cartridge for accommodating the optical disc of a low recording density and a cartridge for accommodating the optical disc of a high recording density, there are many cases where, as the cartridge for accommodating the optical disc of a low recording density has a longer working distance, the distance from the optical disc to the end of the through-thickness structure of the disc in the movement area of the optical head is also longer.

In the case where the first optical head 6 is the optical disc of a high recording density, the distance between the optical disc 1 and the objective lens of the first optical head 6 becomes shorter. In this case, if the optical disc of a high recording density is mistakenly accommodated in the cartridge supporting the optical disc of a low recording density and is placed on the disc tray 16, it is necessary to record and/or reproduce the data by using the first optical head 6. In this case, however, the cartridge supports the optical disc of a low recording density. Therefore, there is a possibility that the through-thickness structure of the disc such as the side surface, etc. of the cartridge may contact the objective lens of the first optical head 6 so as to damage the first optical head 6 while the optical head 6 moves from the optical head storing portion 53 to the transport unit 52 and to the position capable of recording and/or reproducing the data on the optical disc 1.

If the second optical head 7 comprises a lens having the NA of such a large value, there is no obstacle able to contact the objective lens of the second optical head 7 when the second optical head 7 moves from the optical head storing portion 53 to the transport unit 52. And the above-mentioned problem does not arise because the second optical head 7 moves to the transport unit 52 and then vertically moves to approach the optical disc.

For this reason, it is desirable, in the case where the recording densities of the first optical head 6 and the second optical head 7 are different and the NAs of their respective lenses are different, to render an optical pickup of a larger NA as the second optical head 7. Therefore, it is preferable that the second optical head 7 has the lens of a larger NA than the first optical head 6 and support the high recording density.

Figure 4:
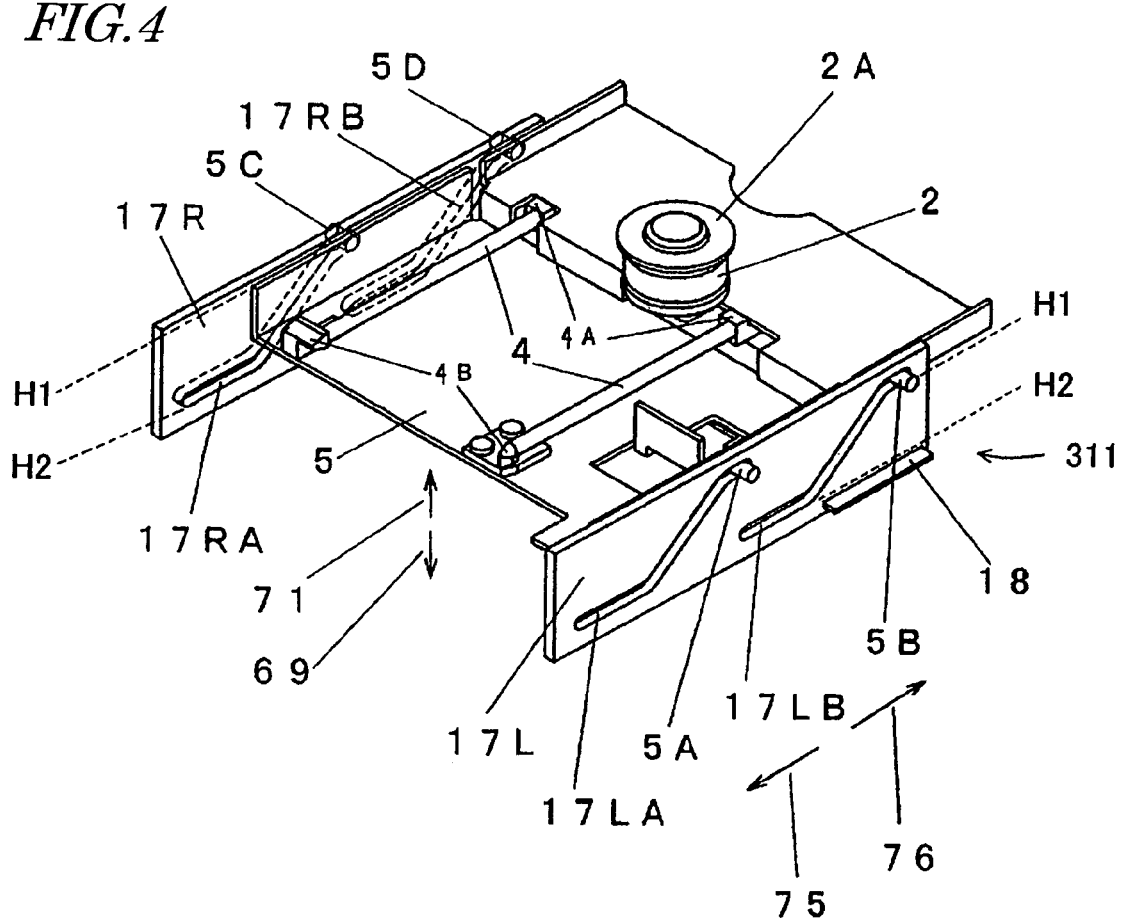
FIG. 4 is a perspective view showing a transport unit elevator of the optical disc apparatus.

Next, a concrete example of the transport unit elevator will be described. FIG. 4 is a perspective view showing a transport unit elevator 311. As shown in FIG. 4, the transport unit elevator 311 includes elevating cams 17L and 17R placed on both sides sandwiching a transport base 5 and transport base elevating bosses 5A, 5B, 5C and 5D provided on both ends sandwiching the disc motor 2 of the transport base 5. The elevating cams 17L and 17R have cam grooves 17LA, 17LB, 17RA and 17RB for guiding the transport base elevating bosses 5A, 5B, 5C and 5D provided thereon. As shown in FIG. 4, the cam grooves 17LA, 17LB, 17RA and 17RB include an area obliquely connecting a height H1 with a height H2. For this reason, if the elevating cams 17L and 17R move in the direction of an arrow 75 in FIG. 4, the transport base elevating bosses 5A, 5B, 5C and 5D move relatively along the cam grooves 17LA, 17LB, 17RA and 17RB so that the transport base 5 ascends in the direction of the arrow 71. If the elevating cams 17L and 17R move in the direction of an arrow 76 in FIG. 4, the transport base elevating bosses 5A, 5B, 5C and 5D move relatively along the cam grooves 17LA, 17LB, 17RA and 17RB so that the transport base 5 descends in the direction of the arrow 69.

Figure 5:
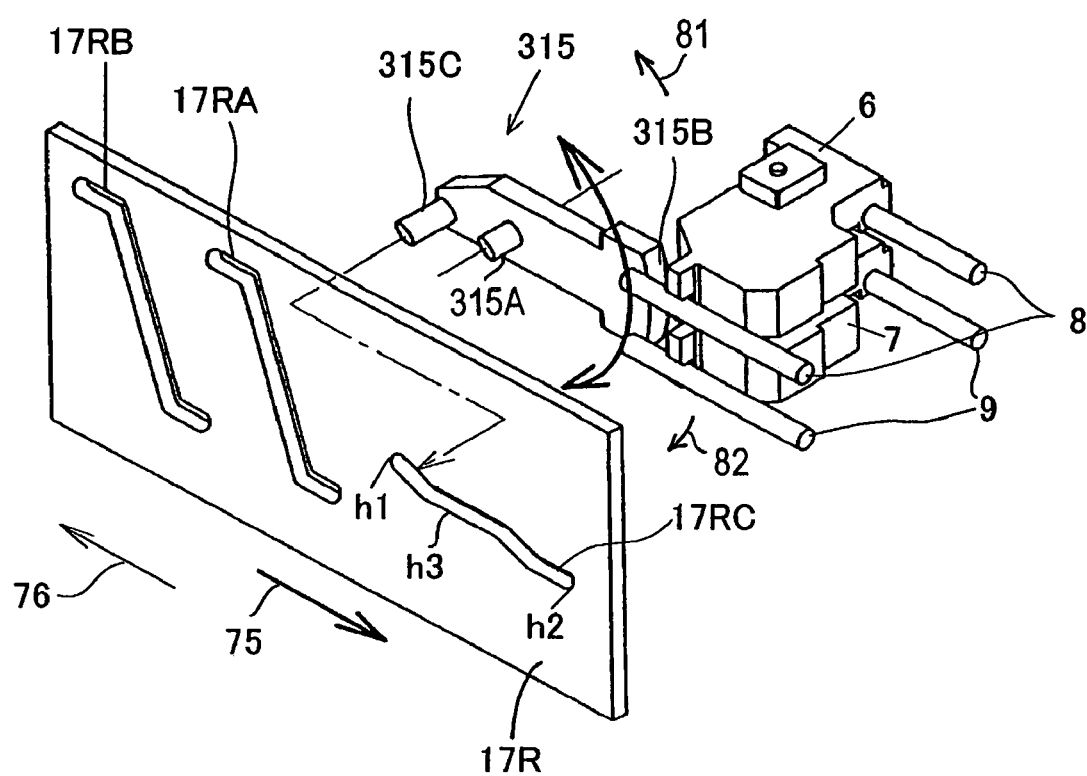
FIG. 5 is a perspective view showing a deformed example of the transport unit elevator.

It is desirable, considering transport of the optical disc apparatus 301, to have the first optical head 6 and the second optical head 7 stored in the optical head storing portion 53 securely stored therein except when being inserted into the transport unit 52. For this reason, the optical disc apparatus 301 may comprise an optical headlock mechanism 315 as shown in FIG. 5. The optical headlock mechanism 315 has a lock contact surface 315B and a lock boss 315C, and is provided to the optical disc apparatus 301 to be capable of swinging about an axis 315A. The elevating cam 17R has a lock cam 17RC for engaging with the lock boss 315C provided thereto.

When the elevating cam 17R moves in the direction of the arrow 76 and the transport unit 52 is at the second position, the lock boss 315C is at a position h2 of the lock cam 17RC. For this reason, the optical headlock mechanism 315 rotates in the direction of an arrow 81 about the axis 315A, and the lock contact surface 315B is at the position capable of contacting the first optical head 6 so as to prevent the first optical head 6 from moving from the first storage support guide 8. At this time, the lock contact surface 315B is at the position incapable of contacting the second optical head 7 so that the second optical head 7 can move to the transport unit 52.

If the elevating cam 17R moves in the direction of the arrow 75 and the transport unit 52 ascends from the second position, the lock boss 315C moves to a position h3 of the lock cam 17RC. At this time, the optical headlock mechanism 315 rotates in the direction of an arrow 82 about the axis 315A from the above-mentioned state, and is put in the state shown in FIG. 5. As shown in FIG. 5, the lock contact surface 315B is at the position capable of contacting the first optical head 6 and the second optical head 7 so as to prevent the first optical head 6 from moving from the first storage support guide 8 and prevent the second optical head 7 from moving from the second storage support guide 9.

When the elevating cam 17R moves further in the direction of the arrow 75 and the transport unit 52 reaches the first position, the lock boss 315C is at a position h1 of the lock cam 17RC. For this reason, the optical headlock mechanism 315 rotates in the direction of the arrow 82 about the axis 315A, and the lock contact surface 315B is at the position capable of contacting the second optical head 7 so as to prevent the second optical head 7 from moving from the second storage support guide 9. At this time, the lock contact surface 315B is at the position incapable of contacting the first optical head 6 so that the first optical head 6 can move to the transport unit 52.

Thus, the optical headlock mechanism 315 can independently lock the first optical head 6 and the second optical head 7. And it locks all the optical heads in the case where the transport unit 52 is not at the position for transporting any optical head.

Figure 6:
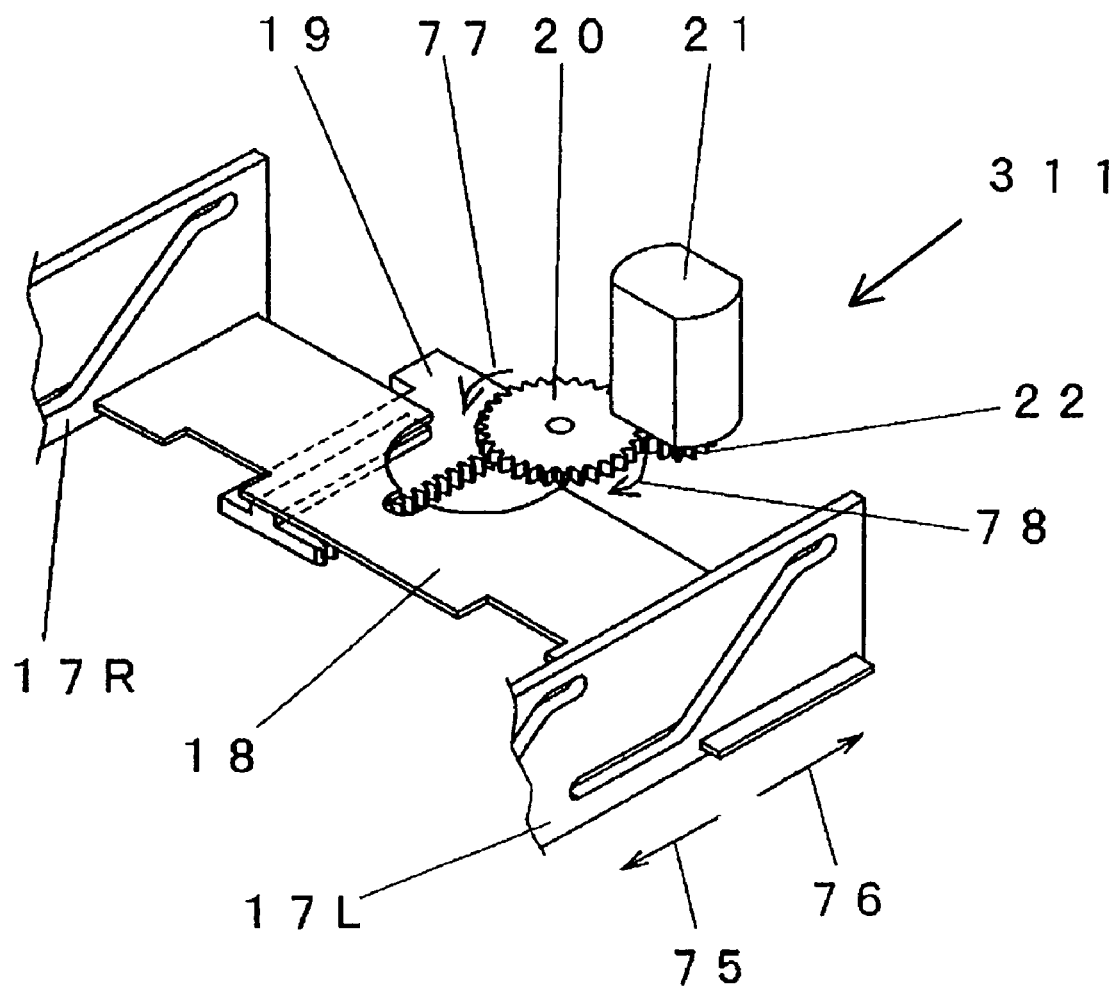
FIG. 6 is a perspective view showing a neighborhood of a driving source of the transport unit elevator.

FIG. 6 is a perspective view showing an example of a driving system for moving the elevating cams 17L and 17R in the directions of the arrows 75 and 76. The transport unit elevator 311 includes a linkage plate 18 for linking the elevating cams 17L and 17R. The linkage plate 18 has an elevating rack 19 mounted thereon. The elevating rack 19 engages with an elevating intermediate gear 20 which is a stepped gear, and an elevating motor 21 as a driving source of an elevating driving force rotates an elevating motor gear 22 in the direction of an arrow 77 or 78 so that the elevating cams 17L and 17R move in the direction of the arrow 75 or 76 respectively. Thus, the transport unit elevator 311 moves the transport base 5 in the directions of the arrows 71 and 69.

In the transport unit elevator 311, the transport base 5 is not completely fixed on the elevating cams 17L and 17R in order to provide clearances necessary for movement between the transport base elevating bosses 5A, 5B, 5C and 5D and the cam grooves 17LA, 17LB, 17RA and 17RB. For this reason, there is a possibility that unnecessary resonance may occur on the transport base 5 due to the rotation of the disc motor 2 and so on. To prevent this, it is possible to force the transport base 5 on the elevating cams 17L and 17R with a member such as a blade spring so as to remove the clearances between the transport base elevating bosses 5A, 5B, 5C and 5D and the cam grooves 17LA, 17LB, 17RA and 17RB.

Figure 7:
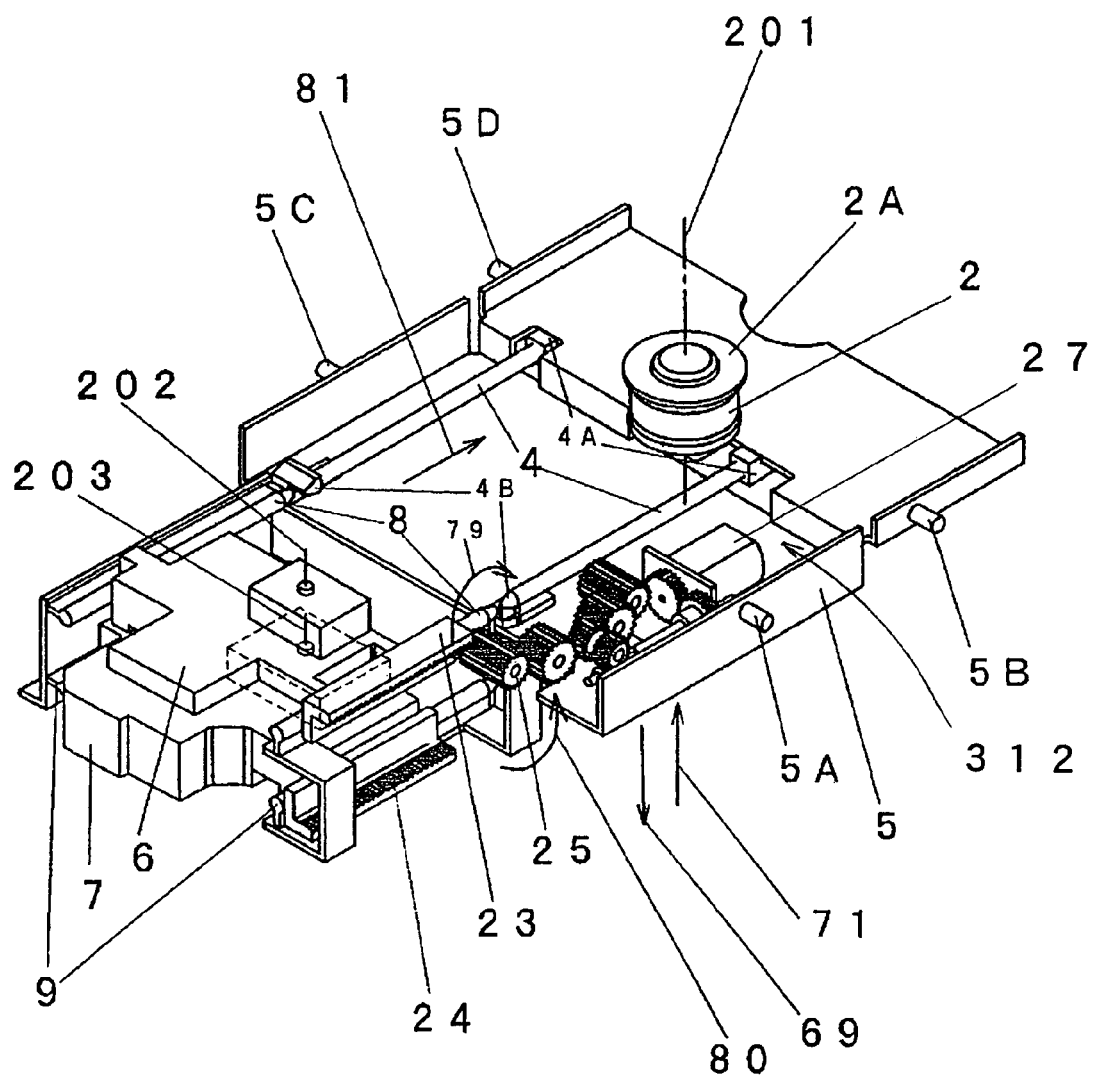
FIG. 7 is a perspective view showing an optical head insertion/removal and transport mechanism of the optical disc apparatus.

Next, a description will be given by referring to FIGS. 7 and 13 as to an optical head insertion/removal and transport mechanism 312 comprising the insertion and removal mechanism for moving each optical head between the optical head storing portion 53 and the transport unit 52 and a transport mechanism for transporting the optical head in the guide configuration 4 of the transport unit 52. According to this embodiment, one driving source is shared by the insertion and removal mechanism and the transport mechanism. For this reason, the insertion and removal mechanism and the transport mechanism are described as one mechanism. However, these mechanisms may also be separate. As shown in FIG. 7, the first optical head 6 and the second optical head 7 have a first transport rack 23 and a second transport rack 24. The first transport rack 23 and the second transport rack 24 extend in the same directions as the first storage support guide 8, the second storage support guide 9 and the guide configuration 4, and are placed so that their respective gears are opposed.

The insertion and removal mechanism of the optical head insertion/removal and transport mechanism 312 has an insertion gear 25 placed on the transport base 5 and a transport motor 27 for rotating the insertion gear 25. As shown in FIG. 7, when the transport base 5 ascends or descends in the direction of the arrow 69 or 71, the insertion gear 25 contacts the first transport rack 23 of the first optical head 6 or the second transport rack 24 of the second optical head 7 so as to engage with the first transport rack 23 or the second transport rack 24. The insertion gear 25 rotates about a rotation axis in a horizontal plane vertical to the direction in which the guide structure 4 extends. "Vertical" herein means the direction parallel with the rotation axis of the optical disc 1, and "horizontal" means the direction orthogonal to this direction.

In the case of inserting the first optical head 6 from the optical head storing portion 53 to the transport unit 52, the transport unit 52 is elevated in the direction of the arrow 71 first and is placed at the first position shown in FIG. 1. At the first position, the guide structure 4 of the transport unit 52 and the first storage support guide 8 of the optical head storing portion 53 are placed so that their respective two shafts become almost linear. In the case where the transport unit 52 is at the first position from the beginning, it is not necessary to move the transport unit 52.

If the transport unit 52 reaches the first position, the insertion gear 25 engages with the first insertion rack 23. If the insertion gear 25 is rotated in the direction of an arrow 79 by a transport motor 2 of the optical head insertion/removal and transport mechanism 312, the first optical head 6 moves in the direction of the arrow 81 so as to be supported by a guide shaft 4. Thus, the first optical head 6 is inserted from the optical head storing portion 53 to the transport unit 52.

When inserting the second optical head 7 from the optical head storing portion 53 to the transport unit 52, the transport unit 52 is lowered in the direction of the arrow 69, and the transport unit 52 is placed at the second position shown in FIG. 2. At the second position, the guide shaft 4 of the transport unit 52 and the second storage support guide 9 of the optical head storing portion 53 are placed so that their respective two shafts become almost linear. In the case where the transport unit 52 is at the second position from the beginning, it is not necessary to move the transport unit 52.

If the transport unit 52 reaches the second position, the insertion gear 25 engages with the second transport rack 24. If the insertion gear 25 is rotated in the direction of an arrow 80 by the transport motor 2 of the optical head insertion/removal and transport mechanism 312, the first optical head 6 moves in the direction of the arrow 81 so as to be supported by the guide structure 4. Thus, the second optical head 7 is inserted from the optical head storing portion 53 to the transport unit 52.

In the optical disc apparatus 301, accuracy of an inclination between the shaft of the guide structure 4 along which the optical head moves and the turntable 2A significantly influences performance of the apparatus. For this reason, it is desirable that the supporting members 4A and 4B have a structure capable of adjusting the position of the guide structure 4 in order to adjust it in an assembly process and so on. It is also desirable that the first storage support guide 8 and the second storage support guide 9 should be adjustably fixed to the optical head storing portion 53 so that, when the transport unit 52 is at the first position and at the second position, the guide structure 4 and the first storage support guide 8 and second storage support guide 9 of the optical head storing portion 53 become linear respectively. In the case where the above-mentioned positioning structure is not provided to the guide structure 4, the first storage support guide 8 and the second storage support guide 9, it is possible to provide to the optical head the structure for adjusting the optical axis of the light beams in order to secure the accuracy of the inclination between the optical axis of the light beams emitted from the optical head and the turntable 2A.

The first optical head 6 and the second optical head 7 are stored in the optical head storing portion 53 so that the insertion gear 25 of the optical head insertion/removal and transport mechanism 312 provided to the transport unit 52 can engage with the first transport rack 23 and the second transport rack 24. For this reason, in the case where the transport unit 52 is at the first position in a state of having the second optical head 7 inserted therein, the insertion gear 25 of the optical head insertion/removal and transport mechanism 312 engages with the first transport rack 23 of the first optical head 6 and causes unnecessary movement to the first optical head 6. Therefore, the optical disc apparatus 301 has an engagement avoiding mechanism so that the insertion gear 25 will not engage with the first transport rack 23 in such cases. An example of a concrete structure of the engagement avoiding mechanism will be described in detail below.

In FIG. 7, the pair of shafts constituting the first storage support guide 8 and the second storage support guide 9 respectively is of the same length. However, it is also possible, by rendering the pair of shafts of different lengths, to have the optical head transferred more securely between the optical head storing portion 53 and the transport unit 52.

Figure 8:
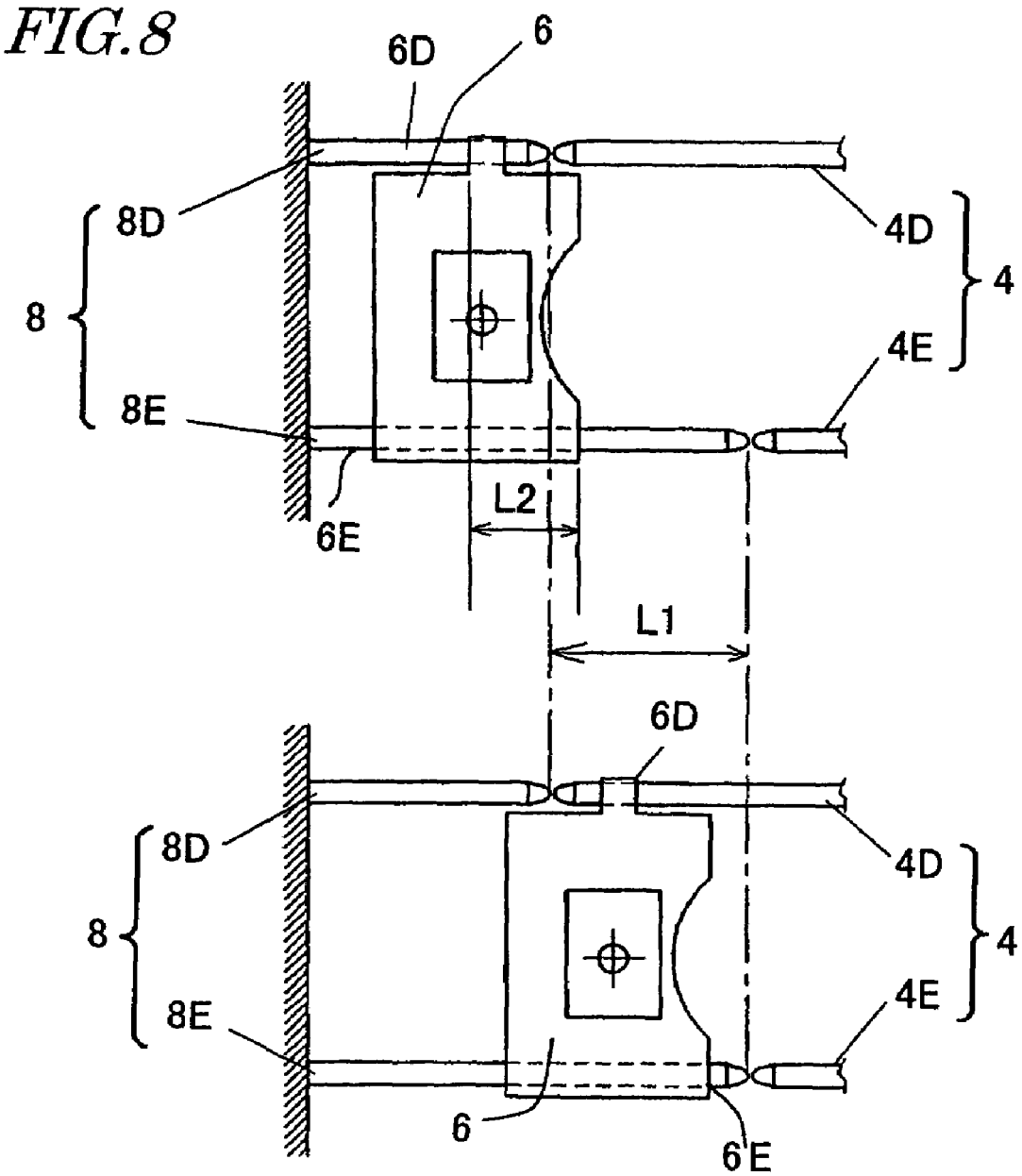
FIG. 8 is a plan view showing a deformed example of a guide structure.

For instance, as shown in FIG. 8, the first storage support guide 8 is comprised of a first shaft 8B and a second shaft 8E. Although it is not shown, the second storage support guide 9 also has the same structure. In addition, the guide structure 4 of the transport unit 52 is comprised of first shafts 4D and 4E. The second shaft 8E of the first storage support guide 8 is longer than the first shaft 8B by L1. Therefore, the second shaft 4E of the transport unit 52 is shorter than the first shaft 4D by L1.

The first optical head 6 comprises a first guide receiving portion 6D and a second guide receiving portion 6E having grooves or holes for receiving the first shaft 4D and the first shaft 8B. In this case, the distance between the front end of the second guide receiving portion 6E and the rear end of the first guide receiving portion 6D seen from the transport unit 52 side is L2. Although it is not shown, the second optical head 7 also has the same structure.

As shown in FIG. 8, when the first optical head 6 moves from the optical head storing portion 53 to the transport unit 52 in the case where the distances L1 and L2 satisfy L1>L2, the second guide receiving portion 6E is supported by the second shaft 8E of the optical head storing portion 53 until the first guide receiving portion 6D completely moves to the first shaft 4D of the transport unit 52. Inversely, when the first optical head 6 moves to the optical head storing portion 53 from the transport unit 52, the first guide receiving portion 6D is supported by the first shaft 4D of the transport unit 52 until the second guide receiving portion 6E completely moves to the second shaft 8E of the optical head storing portion 53. Although it is not shown, the second optical head 7 is moved likewise.

It is possible, by doing so, to no longer have a boundary between the shaft of the optical head storing portion 53 and the shaft of the transport unit 52 simultaneously straddled by the two guide receiving portions of the optical head so as to prevent the optical head position from seriously getting out of order between the shaft of the optical head storing portion 53 and the shaft of the transport unit 52. Consequently, it is possible to stably drive the optical head with the optical head insertion/removal and transport mechanism 312.

Figure 9:
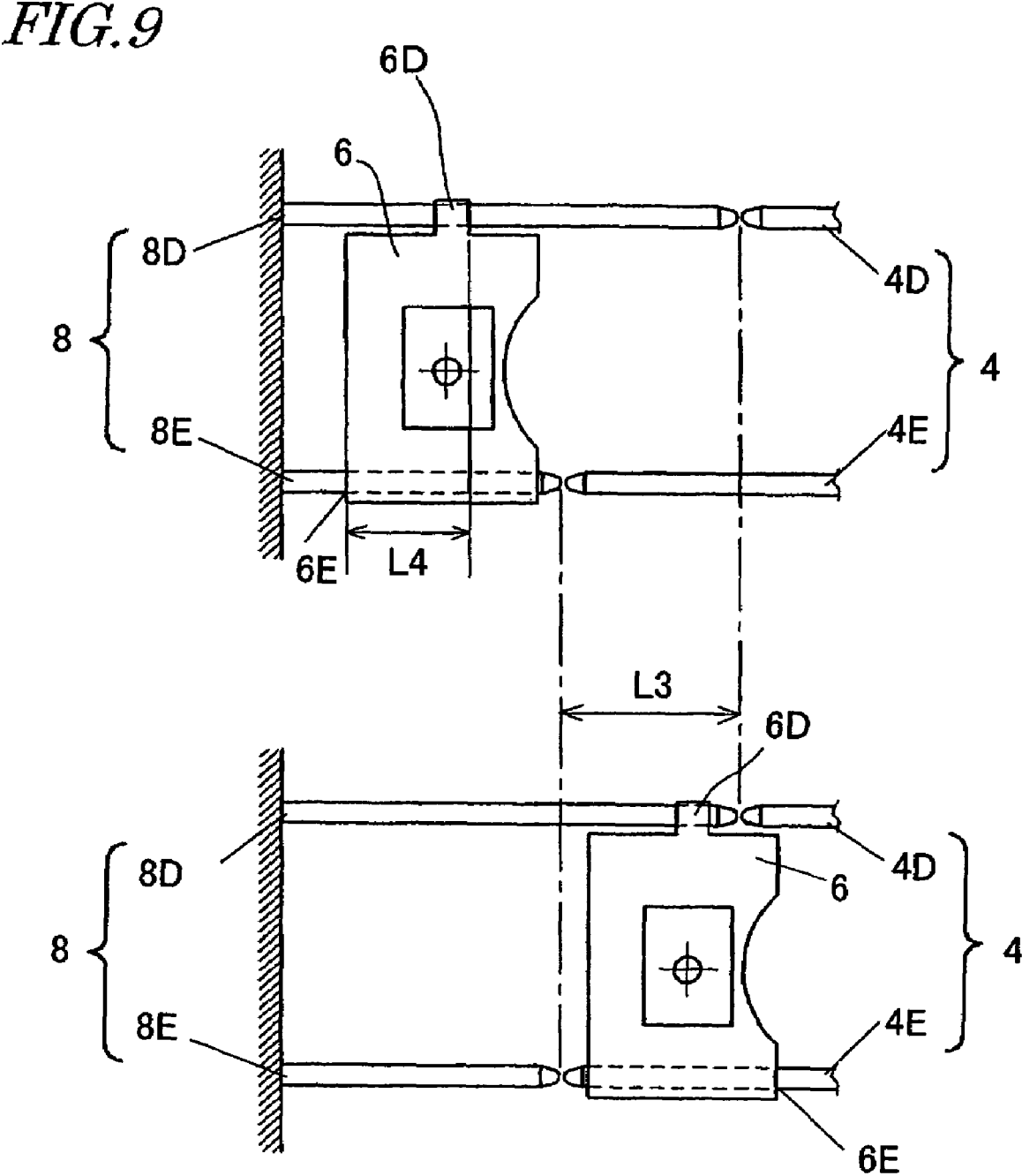
FIG. 9 is a plan view showing another deformed example of the guide structure.

As shown in FIG. 9, in the case where the first shaft 8D of the first storage support guide 8 is longer than the second shaft 8E just by L3, it should satisfy L3>L4 when the distance between the front end of the first guide receiving portion 6D and the rear end of the second guide receiving portion 6E is L4 as to the first optical head 6.

Figure 10:
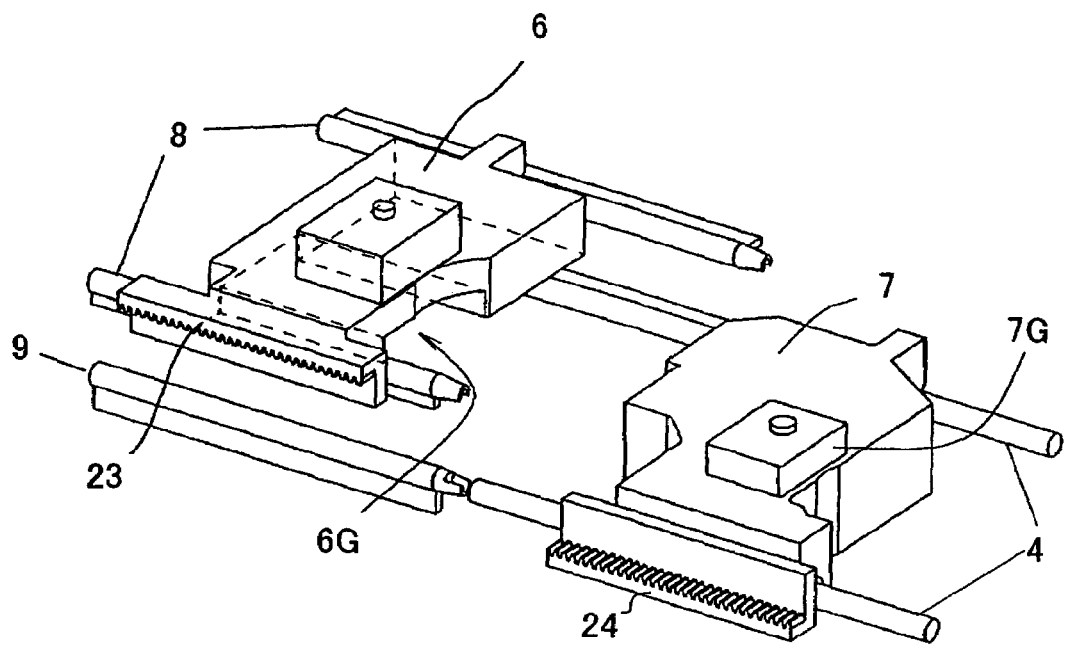
FIG. 10 is a perspective view showing a deformed example of the optical head.
Figure 11:
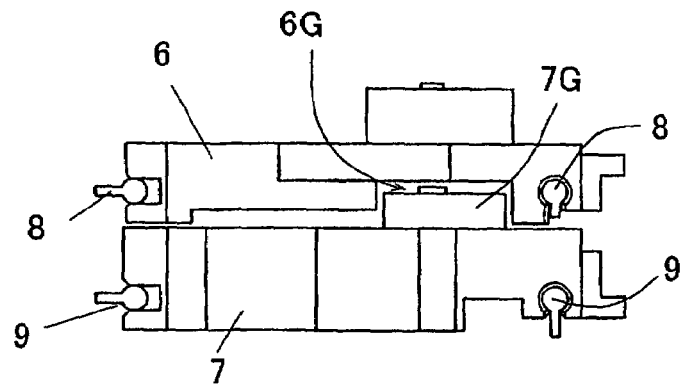
FIG. 11 is a sectional view of FIG. 10.

As shown in FIG. 10, in the case where the portion of the second optical head 7 for emitting the light beams forms a convex portion 7G as shown therein, it is possible to provide a concave portion 6G for accommodating at least a part of the convex portion 7G at the bottom of the first optical head 6. As shown in FIG. 11, when the first optical head 6 and the second optical head 7 are stored in the optical head storing portion 53, it is possible, by having such a structure, to prevent the dust and so on from accumulating at the front end of the convex portion 7G of the second optical head 7 so as to prevent the dust from adhering to an emitting portion and a receiving portion of the light beams and causing recording and reproducing errors. It is also feasible, in the optical head storing portion 53, to narrow vertical space between the first optical head 6 and the second optical head 7 and reduce the height of the optical disc apparatus 301.

Subsequently, a description will be given as to the operation in which the first optical head 6 and the second optical head 7 are inserted into the transport unit 52, and then are transported as guided by the guide shaft 4. FIG. 13 is a perspective view showing how the first optical head 6 is inserted into the transport unit 52. The transport mechanism of the optical head insertion/removal and transport mechanism 312 has a transport gear 26 for transporting the first optical head 6 by engaging with a first transport rack 18. And if the transport gear 26 rotates in the direction of the arrow 82 or 83, the first transport rack 23 and the first optical head 6 move in the direction of an arrow 84 or 85. The transport gear 26 rotates about the rotation axis in the horizontal plane vertical to the direction in which the guide structure 4 extends. Thus, after being inserted into the transport unit 52, the first optical head 6 can be moved in one radial direction of the optical disc 1.

Figure 12:
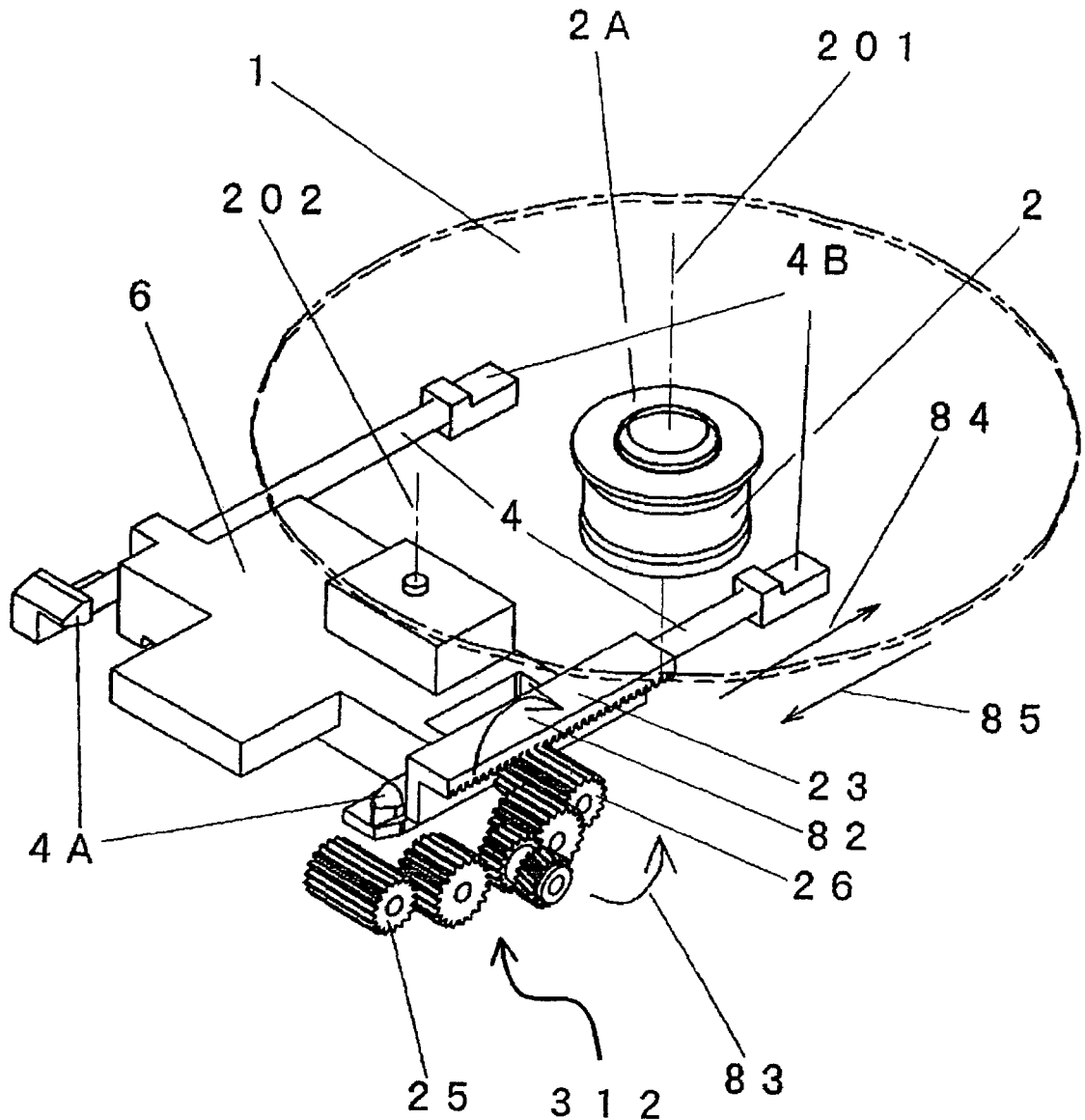
FIG. 12 is a perspective view showing how a first optical head is inserted into a transport unit.
Figure 13:
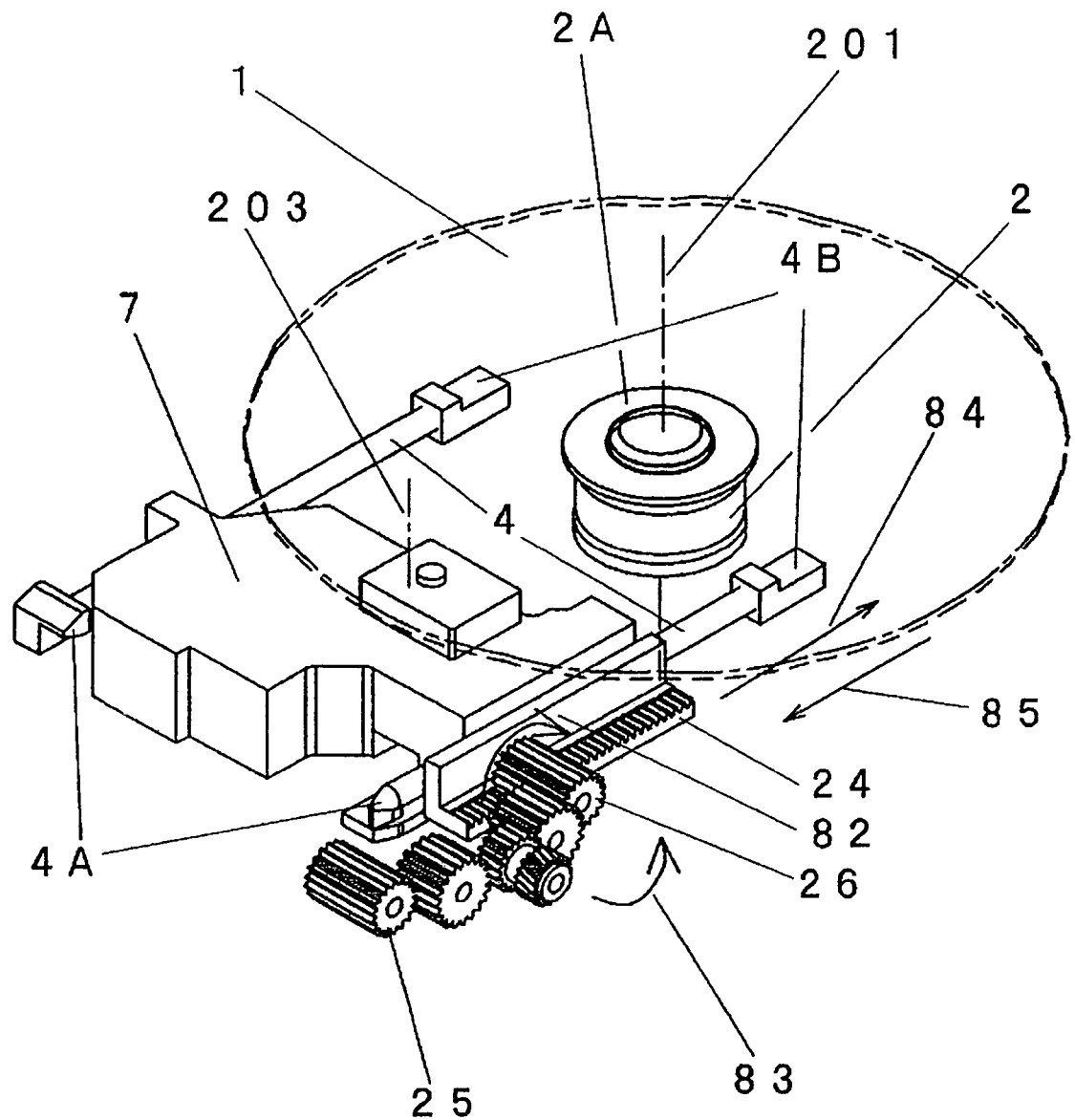
FIG. 13 is a perspective view showing how a second optical head is inserted into the transport unit.

FIG. 13 is a perspective view showing how the second optical head 7 is inserted into the transport unit 52. As with FIG. 12, if the transport gear 26 of the optical head insertion/removal and transport mechanism 312 rotates in the direction of the arrow 82 or 83, the second transport rack 24 and the second optical head 7 move in the direction of an arrow 85 or 84. Thus, after being inserted into the transport unit 52, the second optical head 7 can be moved in one radial direction of the optical disc 1.

As shown in FIGS. 7, 12 and 13, the plane surface including a rotational central axis 201 of the disc motor 2 and an optical axis 202 of the light beams emitted from the first optical head 6 and the plane surface including the rotational central axis 201 of the disc motor 2 and an optical axis 203 of the light beams emitted from the second optical head 7 are mutually the same in substance, and are substantially parallel with a shaft center of the guide configuration 4. Thus, it is possible, just by linearly inserting the first optical head 6 and the second optical head 7 into the guide structure 4, to transport the optical axis centers 202 and 203 of the light beams of the first optical head 6 and the second optical head 7 radially on the optical disc 1 placed on the turntable 2A. "In substance" means within the range of a normal design error.

Figure 14:
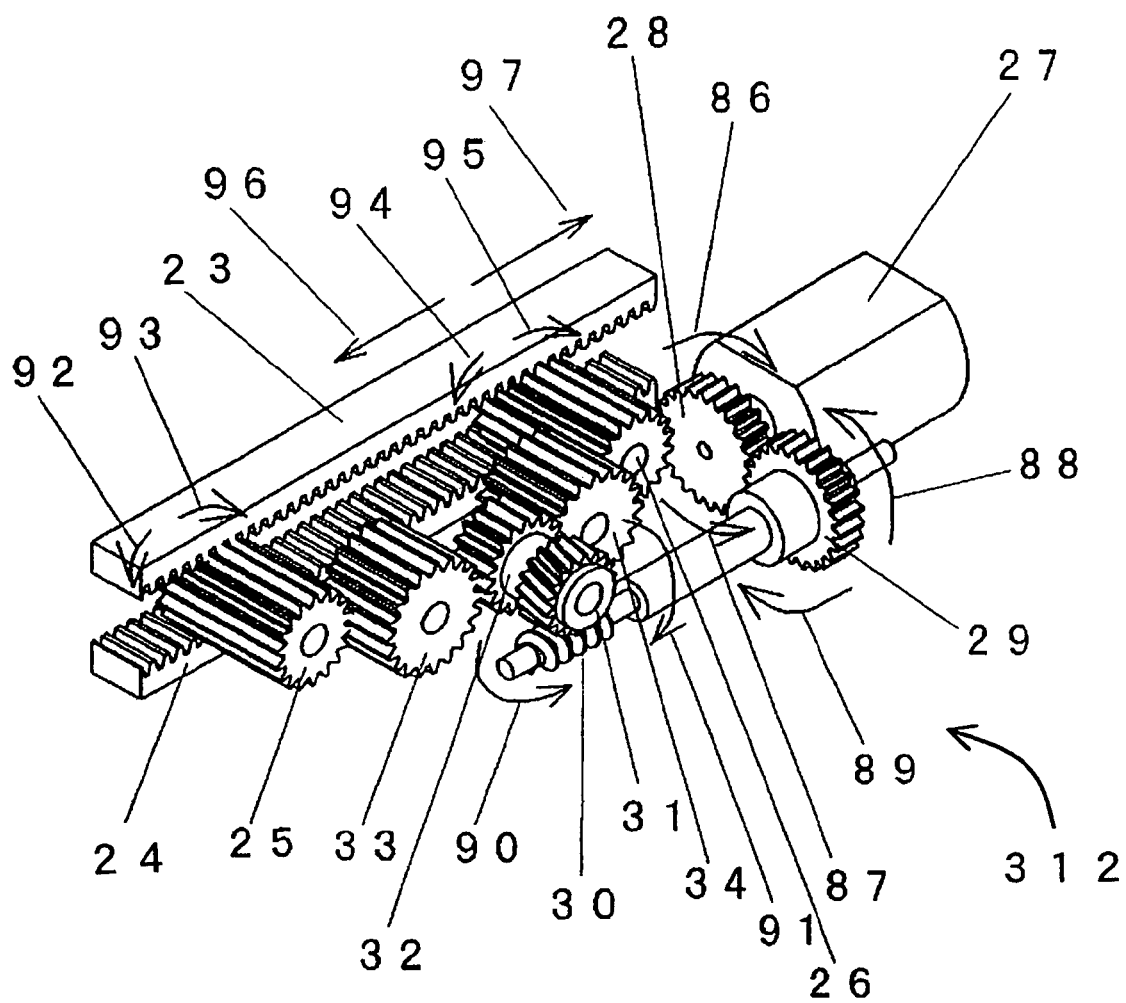
FIG. 14 is an enlarged perspective view showing a main portion of the optical head insertion/removal and transport mechanism.

FIG. 14 is a perspective view showing an example of a concrete structure of the optical head insertion/removal and transport mechanism 312. The optical head insertion/removal and transport mechanism 312 includes a transport motor gear 28 for integrally rotating with a driving axis of the driving source transport motor 27, a first-step transport gear 29 having an axis parallel with the transport motor gear 28 for engaging therewith, a worm gear 30 for integrally rotating with the first-step transport gear 29, and a worm wheel 31 having an axis at a position of a twist clear of and orthogonal to the worm gear 30 in addition to the above-mentioned driving source transport motor 27. The optical head insertion/removal and transport mechanism 312 also includes a central gear 32 with the same axis center as the worm wheel 31 for integrally rotating therewith, an insertion intermediate gear (preliminary gear) 33 having an axis parallel with the central gear 32 for engaging therewith to drive the insertion gear 25 and a transport intermediate gear (preliminary gear) 34 having an axis parallel with the central gear 32 for driving the transport gear 26.

FIG. 14 represents the insertion gear 25, transport gear 26, transport motor gear 28, first-step transport gear 29, central gear 32, insertion intermediate gear 33 and transport intermediate gear 34 as spur gears. It is possible, however, to use other gears in the case of gear forms such as helical gears in which the engaging gears mutually have parallel axes. In FIG. 14, both the proceeding direction of the worm gear 30 and twisting direction of the worm wheel 31 are rightward, but these directions may also be leftward.

If the driving source transport motor 27 rotates in the direction of an arrow 87, the first-step transport gear 29 and the worm gear 30 rotate in the direction of an arrow 89, and the worm wheel 31 engaging with the worm gear 30 rotates in the direction of an arrow 90. Thus, the insertion gear 25 rotates in the direction of an arrow 0.92, and the transport gear 26 rotates in the direction of an arrow 94 respectively.

At this time, if the first optical head 6 is inserted into the transport unit 52, the first transport rack 23 engages with the transport gear 26. The first optical head 6 is rotated in the direction of an arrow 96 by the rotation of the transport gear 26 in the direction of the arrow 94. If the first optical head 6 is moved in the direction of the arrow 96 by the transport gear 26 and the first transport rack 23 reaches the position for engaging with the insertion gear 25, the first transport rack 23 receives the driving force from the insertion gear 25 so that, as the insertion gear 25 rotates in the direction of the arrow 92, the first optical head 6 moves in the direction of the arrow 96 and is ejected from the transport unit 52.

If the second optical head 7 is inserted into the transport unit 52, the second transport rack 24 engages with the transport gear 26. The second optical head 7 is moved in the direction of an arrow 97 by the rotation of the transport gear 26 in the direction of the arrow 94. If the second optical head 7 is stored in the optical head storing portion 53, the second transport rack 24 engages with the insertion gear 25. For this reason, as the insertion gear 25 rotates in the direction of the arrow 92, the second optical head 7 moves in the direction of the arrow 97 and is inserted into the transport unit 52.

If the driving source transport motor 27 rotates in the direction of an arrow 86, the first-step transport gear 29 and the worm gear 30 rotate in the direction of an arrow 88, and the worm wheel 31 engaging with the worm gear 30 rotates in the direction of an arrow 91. Thus, the insertion gear 25 rotates in the direction of an arrow 93, and the transport gear 26 rotates in the direction of an arrow 95 respectively.

At this time, if the first optical head 6 is inserted into the transport unit 52, the first transport rack 23 engages with the transport gear 26, and the transport gear 26 rotates in the direction of the arrow 95 so that the first optical head 6 is moved in the direction of the arrow 97. If the first optical head 6 is stored in the optical head storing portion 53, the first transport rack 23 is engaging with the insertion gear 25. As the insertion gear 25 rotates in the direction of the arrow 93 in this state, the first optical head 6 moves in the direction of the arrow 97 and is inserted into the transport unit 52.

If the second optical head 7 is inserted into the transport unit 52, the second transport rack 24 engages with the transport gear 26. As the transport gear 26 rotates in the direction of the arrow 95 in this state, the second optical head 7 is moved in the direction of the arrow 96. If the second optical head 7 is moved in the direction of the arrow 96 by the transport gear 26 and the second transport rack 24 reaches the position for engaging with the insertion gear 25, the second transport rack 24 receives the driving force from the insertion gear 25 so that, as the insertion gear 25 rotates in the direction of the arrow 93, the second transport rack 24 moves in the direction of the arrow 96 and the second optical head 7 is ejected from the transport unit 52.

As described above, it becomes possible, by selecting either the first optical head 6 or the second optical head 7 as appropriate, to record or reproduce the data on the optical discs 1.

Figure 15:
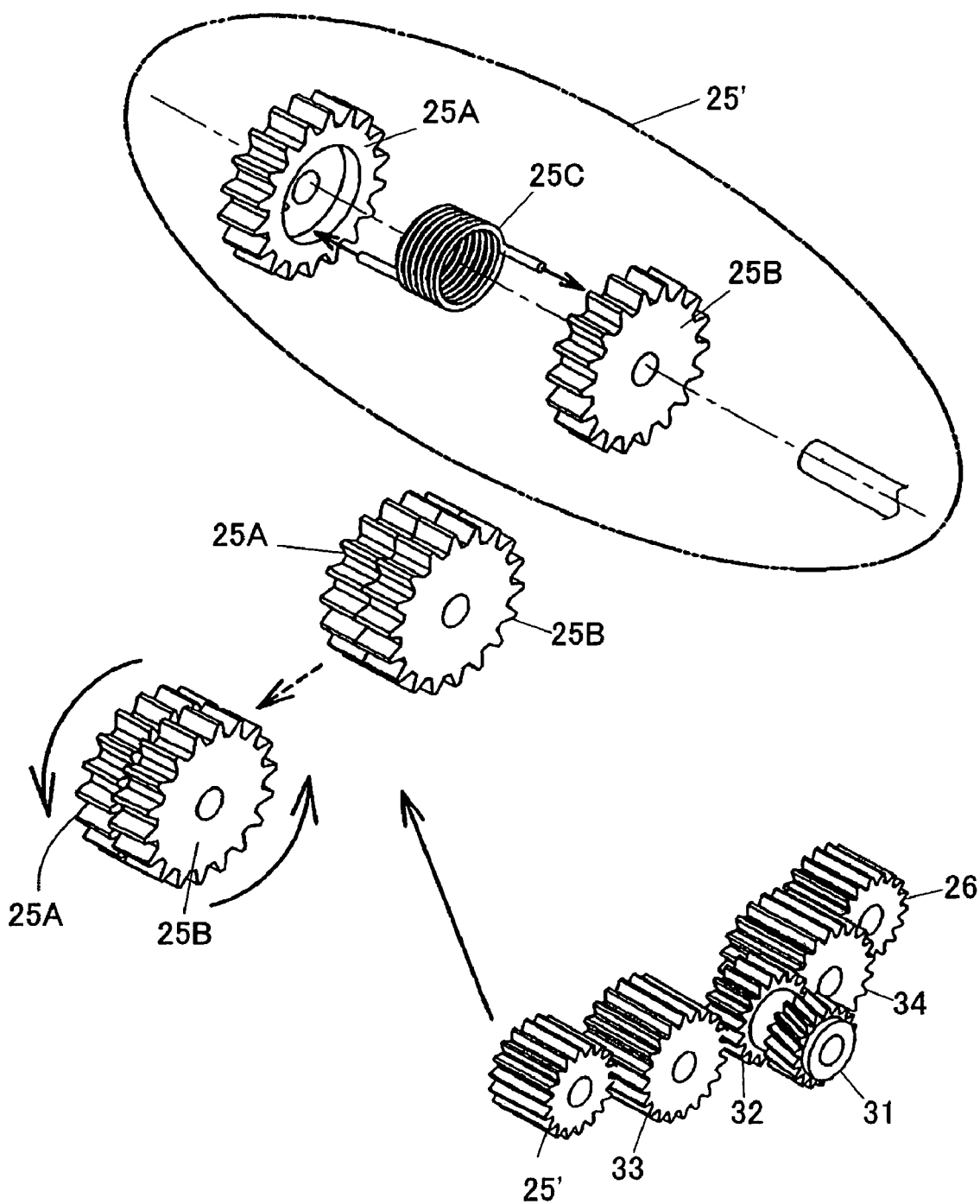
FIG. 15 is a perspective view showing a deformed example of the optical head insertion/removal and transport mechanism.

As shown in FIG. 14, if the first optical head 6 and the second optical head 7 further move in the direction of the arrow 97, each of the first transport rack 23 and the second transport rack 24 can be in the state of simultaneously engaging with both the insertion gear 25 and the transport gear 26. At this time, if phases of the insertion gear 25 and the transport gear 26 are deviated, there is a possibility that the first transport rack 23 and the second transport rack 24 cannot be moved correctly and they may come to a stop. To avoid such a problem, it is desirable to provide a mechanism for absorbing a relative phase difference between the insertion gear 25 and the transport gear 26 to the optical head insertion/removal and transport mechanism 312. It is possible to provide the mechanism for absorbing a phase difference to the insertion gear 25 or the transport gear 26, for instance. FIG. 15 shows an insertion gear 25' comprising the mechanism for absorbing the phase difference. The insertion gear 25' includes a first portion 25A for engaging with the first transport rack 23 or the second transport rack 24, a second portion 25B for engaging with the insertion intermediate gear 33 and a spring 25C for elastically linking the first portion 25A and the second portion 25B. In the insertion gear 25' having such a structure, the spring 25C can transmit a torque mutually between the first portion 25A and the second portion 25B while absorbing the phase difference. For this reason, even if any phase difference arises between the second portion 25B of the insertion gear 25' and the transport gear 26, it is possible to resolve the phase difference between the first portion 25A of the insertion gear 25' and the transport gear 26 by the action of the spring 25C so as to correctly move the first transport rack 23 and the second transport rack 24.

Figure 16:
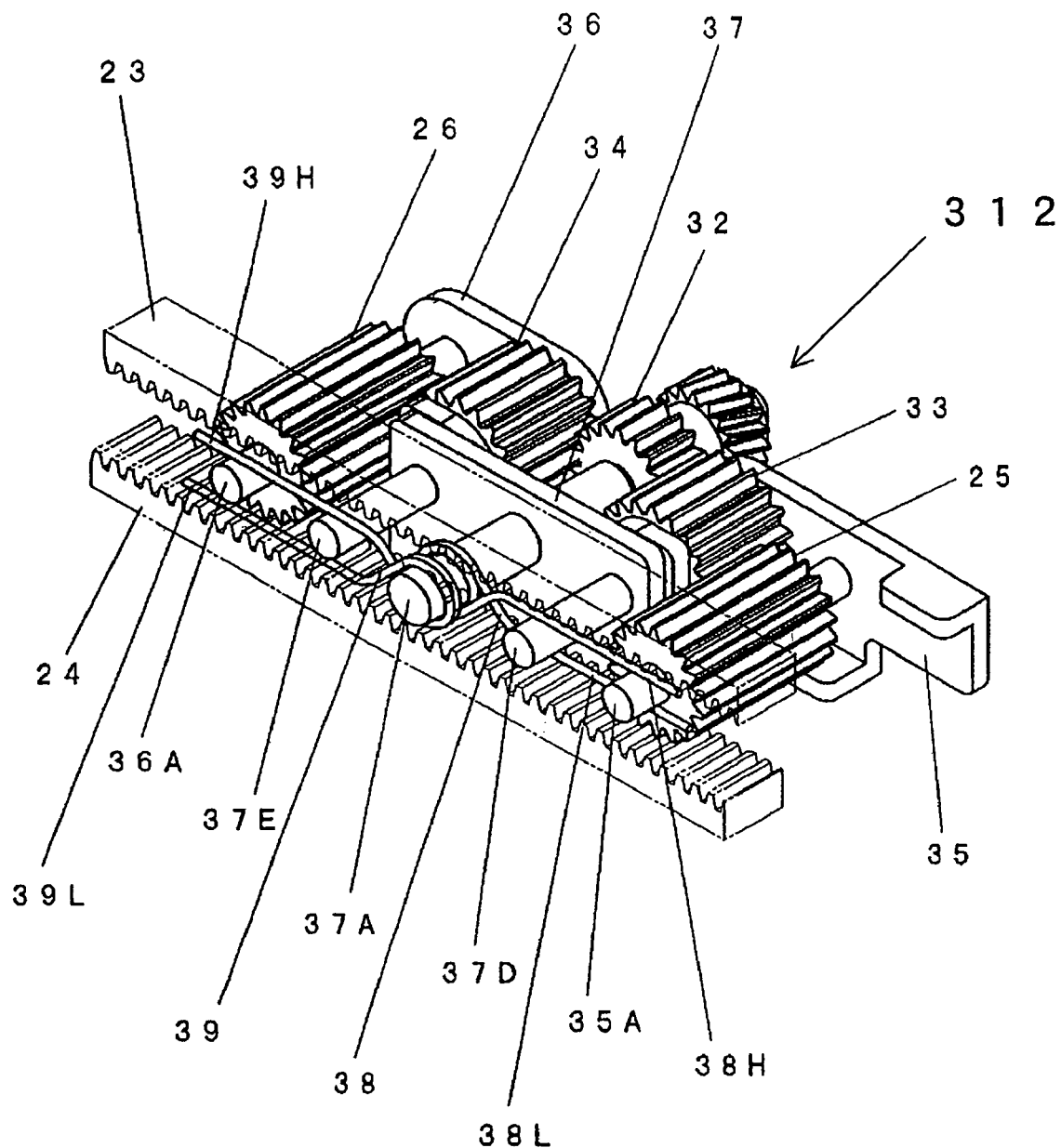
FIG. 16 is a perspective view showing a detailed structure of the optical head insertion/removal and transport mechanism.

Next, a description will be given by referring to FIG. 16 as to the structure for supporting the insertion gear 25 and the transport gear 26 in the optical head insertion/removal and transport mechanism 312. The optical head insertion/removal and transport mechanism 312 has an insertion gear holder 35 for supporting the insertion gear 25 and a transport gear holder 36 for supporting the transport gear 26. The insertion gear holder 35 rotatably supports the insertion gear 25 on an insertion gear rotation axis 35A. The transport gear holder 36 rotatably supports the transport gear 26 on a transport gear rotation axis 36A. The optical head insertion/removal and transport mechanism 312 further has a gear holder support 37 for swingably supporting the insertion gear holder 35 and the transport gear holder 36, and rotatably supports support holes each provided to the insertion gear holder 35 and the transport gear holder 36 on an insertion gear holder support axis 37D and a transport gear holder support axis 37E respectively.

According to this embodiment, the insertion gear holder support axis 37D and the transport gear holder support axis 37E are also rotation centers of the insertion intermediate gear 33 and the transport intermediate gear 34 respectively. Based on such a configuration, the insertion gear 25 and the transport gear 26 are swingably supported with the insertion intermediate gear 33 and the transport intermediate gear 34 as the rotation centers respectively.

The insertion gear 25 and the transport gear 26 are forced by an insertion gear forcing spring (gear forcing mechanism) 38 and a transport gear forcing spring (gear forcing mechanism) 39 in their respective swinging directions. The insertion gear forcing spring 38 and the transport gear forcing spring 39 are supported by putting coil portions of the springs through an forcing spring support bar 37A provided on the gear holder support 37. Foot portions of the springs are locked by the insertion gear holder support axis 37D and the transport gear holder support axis 37E respectively as shown in FIG. 16. Dimensions of the insertion gear rotation axis 35A and transport gear rotation axis 36A, insertion gear holder support axis 37D and transport gear holder support axis 37E are substantially equal to the dimensions between the legs of the insertion gear forcing spring 38 and the transport gear forcing spring 39 respectively.

The insertion gear forcing spring 38 and the transport gear forcing spring 39 are locked by the insertion gear holder support axis 37D and the transport gear holder support axis 37E respectively. If the insertion gear rotation axis 35A and transport gear rotation axis 36A try to swing while being deviated from the positions at which the insertion gear rotation axis 35A, transport gear rotation axis 36A and forcing spring support bar 37A are on the same plane, the insertion gear rotation axis 35A and transport gear rotation axis 36A are forced in the direction opposite to the swinging direction by the energization of the insertion gear forcing spring 38 and the transport gear forcing spring 39. The insertion gear rotation axis 35A and transport gear rotation axis 36A become the centers of the swinging at the positions at which the insertion gear rotation axis 35A and transport gear rotation axis 36A constitute the same plane with the forcing spring support bar 37A.

The operation of the insertion gear 25 and the transport gear 26 will be further described by referring to FIGS. 17 to 20.

First, a description will be given as to the operation of the insertion gear 25 in the case where the first transport rack 23 or the second transport rack 24 is inserted into the transport unit 52 side by the insertion gear 25.

Figure 17:
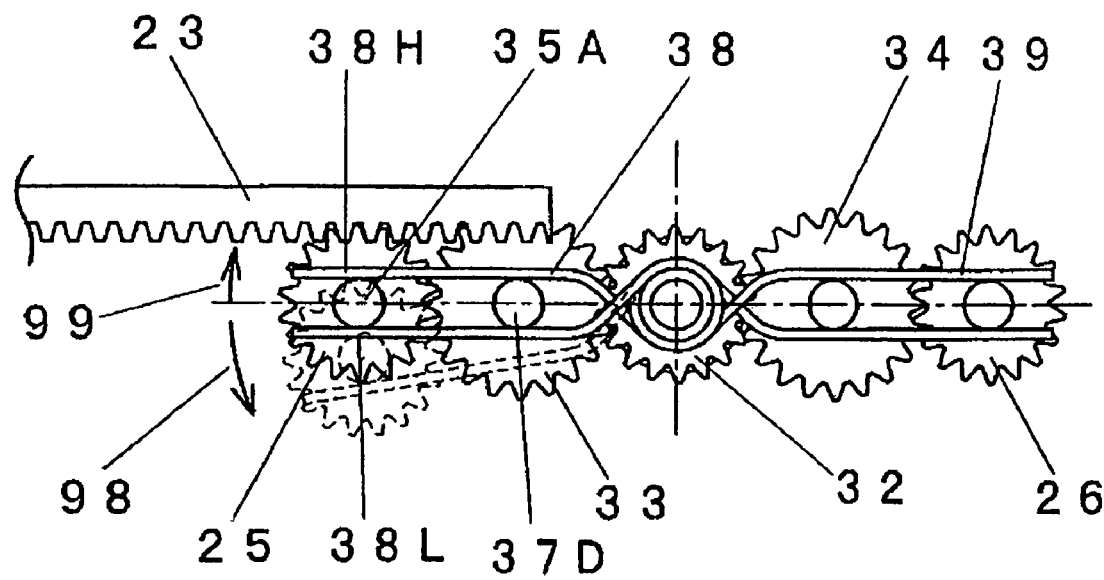
FIG. 17 is a diagram showing how a first transport rack is driven by an insertion gear.

FIG. 17 shows the state of the first transport rack 23 engaging with the insertion gear 25. In FIG. 17, assuming that the insertion gear 25 is at the position of the swinging center, it is constituted so that a reference pitch line of the first transport rack 23 is positioned against a horizontal tangent on the upside of a reference pitch circle of the insertion gear 25 by deviating to the downside in the dimension smaller than a tooth depth of the insertion gear 25. Thus, while the first transport rack 23 is actually engaging with the insertion gear 25, the insertion gear 25 is forced in the direction of an arrow 98 by the first transport rack 23 so as to receive the moment.

In this case, at a contact point with the insertion gear rotation axis 35A, the insertion gear forcing spring 38 forces the insertion gear rotation axis 35A in the direction of an arrow 99 with a foot portion 38L of the insertion gear forcing spring 38 as a reaction force forced by the first transport rack 23. At the contact point with the insertion gear holder support axis 37D, a foot portion 38H of the insertion gear forcing spring 38 forces the insertion gear holder support axis 37D in the direction of the arrow 98. Thus, the insertion gear 25 is forced as appropriate against the first transport rack 23 in the engaging direction by the insertion gear forcing spring 38.

Figure 18:
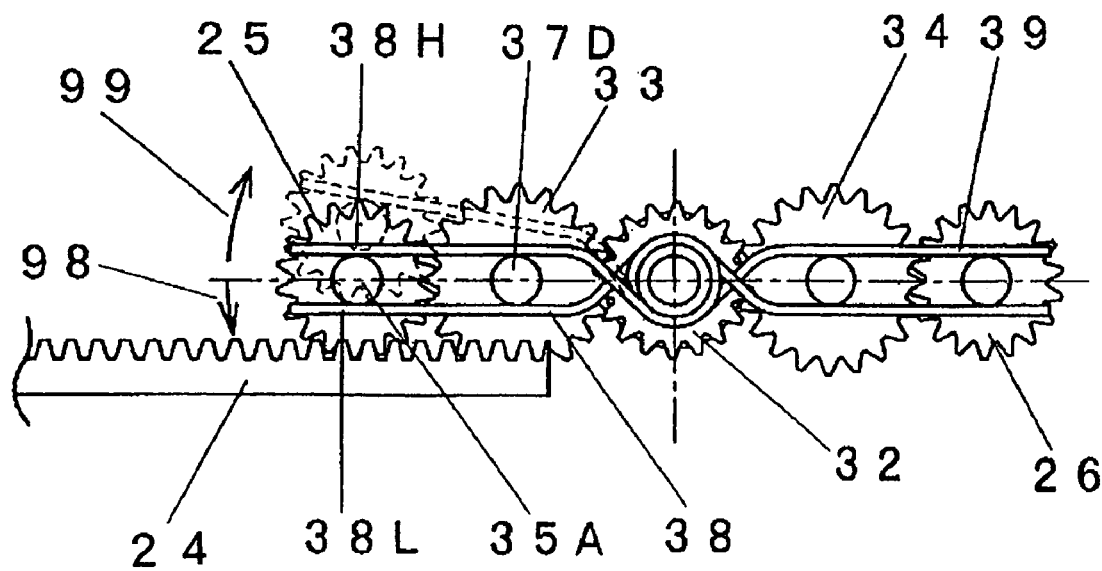
FIG. 18 is a diagram showing how a second transport rack is driven by the insertion gear.

FIG. 18 shows the state of the second transport rack 24 engaging with the insertion gear 25. As described by referring to FIG. 17, if assuming that the insertion gear 25 is at the position of the swinging center in FIG. 18, it is constituted so that the reference pitch line of the second transport rack 24 is positioned against the horizontal tangent on the downside of the reference pitch circle of the insertion gear 25 by deviating to the upside in the dimension smaller than the tooth depth of the insertion gear 25. Thus, while the second transport rack 24 is actually engaging with the insertion gear 25, the insertion gear 25 is forced in the direction of the arrow 99 by the second transport rack 24 so as to receive the moment.

In this case, at the contact point with the insertion gear rotation axis 35A, the insertion gear forcing spring 38 forces it in the direction of the arrow 98 with a foot portion 38H of the insertion gear forcing spring 38 as the reaction force forced by the second transport rack 24. At the contact point with the insertion gear holder support axis 37D, the foot portion 38L of the insertion gear forcing spring 38 forces the insertion gear holder support axis 37D in the direction of the arrow 99. Thus, the insertion gear 25 is forced as appropriate against the second transport rack 24 in the engaging direction by the insertion gear forcing spring 38.

Figure 19:
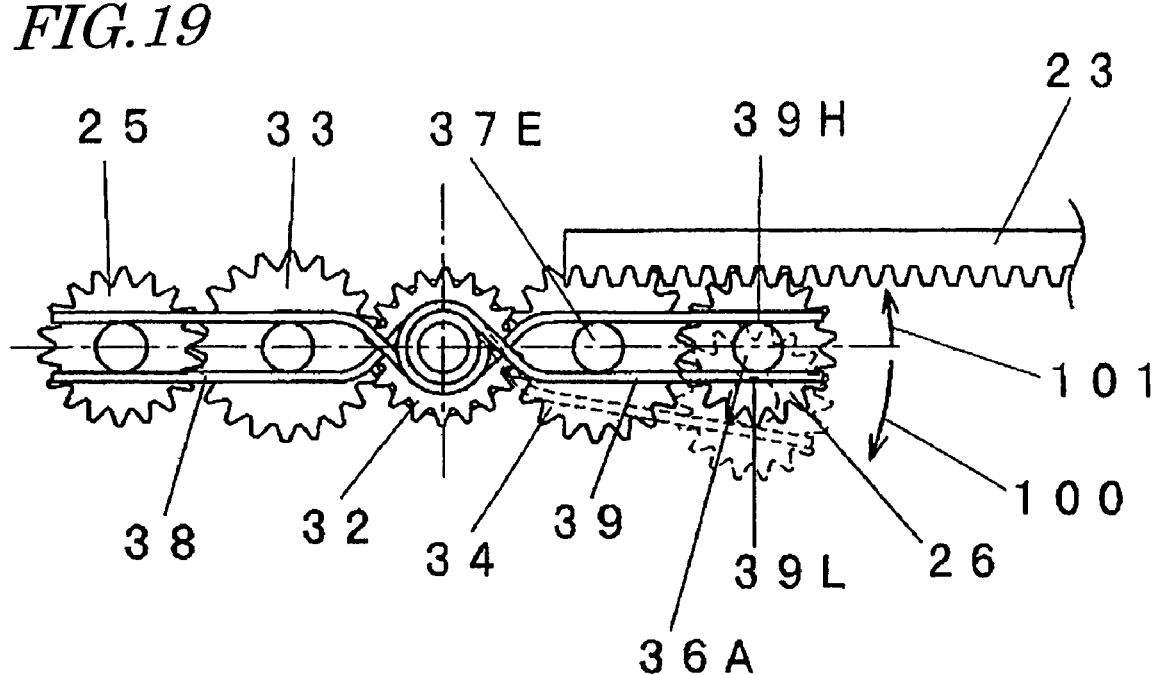
FIG. 19 is a diagram showing how the first transport rack is driven by a transport gear.

FIG. 19 shows the state of the first transport rack 23 engaging with the transport gear 26. In FIG. 19, in the case of assuming that the transport gear 26 is at the position of the swinging center, it is constituted so that the reference pitch line of the first transport rack 23 is positioned against the horizontal tangent on the upside of the reference pitch circle of the transport gear 26 by deviating to the downside in the dimension smaller than the tooth depth of the transport gear 26. Thus, while the first transport rack 23 is actually engaging with the transport gear 26, the transport gear 26 is forced in the direction of an arrow 100 by the first transport rack 23 so as to receive the moment.

In this case, at the contact point with the transport gear rotation axis 36A, the transport gear forcing spring 39 forces the transport gear rotation axis 36A in the direction of an arrow 101 with a foot portion 39L of the transport gear forcing spring 39 as the reaction force forced by the first transport rack 23. At the contact point with the transport gear holder support axis 37E, a foot portion 39H of the transport gear forcing spring 39 forces the transport gear holder support axis 37E in the direction of the arrow 100. Thus, the transport gear 26 is forced against the first transport rack 23 in the engaging direction by the transport gear forcing spring 39.

Figure 20:
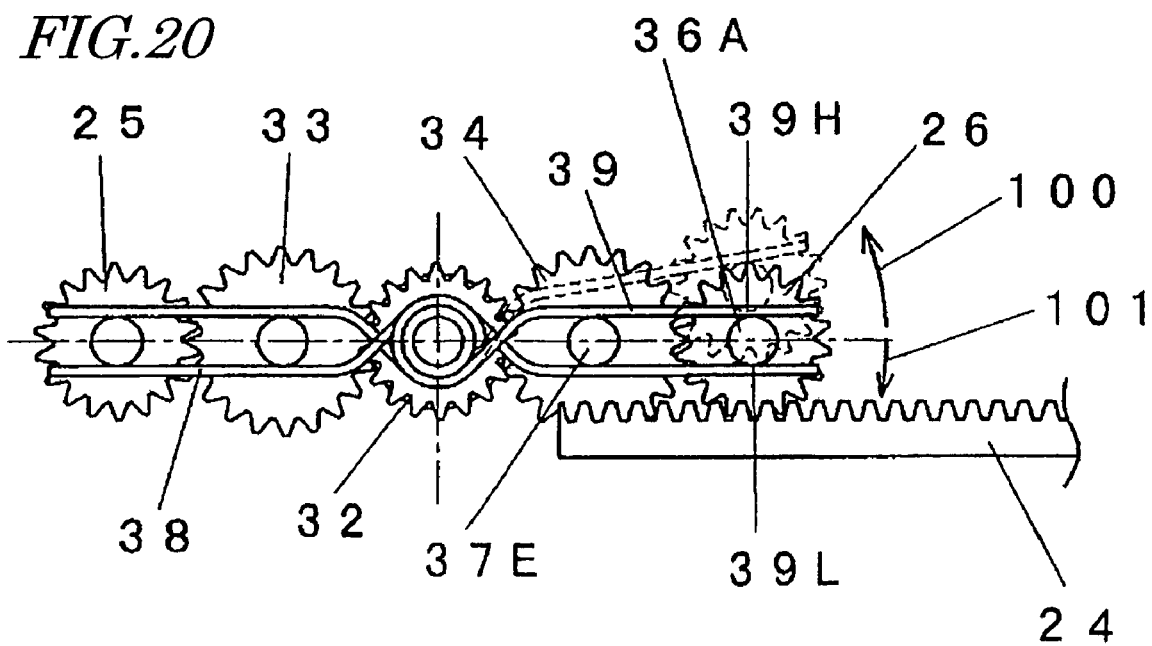
FIG. 20 is a diagram showing how the second transport rack is driven by the transport gear.

FIG. 20 shows the state of the second transport rack 24 engaging with the transport gear 26. In FIG. 20, assuming that the transport gear 26 is at the position of the swinging center, it is constituted so that the reference pitch line of the second transport rack 24 is positioned against the horizontal tangent on the downside of the reference pitch circle of the transport gear 26 by deviating to the upside in the dimension smaller than the tooth depth of the transport gear 26. Thus, while the second transport rack 24 is actually engaging with the transport gear 26, the transport gear 26 is forced in the direction of an arrow 101 by the second transport rack 24 so as to receive the moment.

In this case, at the contact point with the insertion gear rotation axis 36A, the insertion gear forcing spring 39 forces it in the direction of the arrow 100 with the foot portion 39H of the transport gear forcing spring 39 as the reaction force forced by the second transport rack 24. At the contact point with the transport gear holder support axis 37E, the foot portion 39L of the transport gear forcing spring 39 forces the transport gear holder support axis 37E in the direction of the arrow 101. Thus, the transport gear 26 is forced against the second transport rack 24 in the engaging direction by the transport gear forcing spring 39.

As described above, the insertion gear 25 and the transport gear 26 swing about rotation supporting points of the insertion intermediate gear 33 and the transport intermediate gear 34 so that, when or after one of the racks of the first optical head 6 and the second optical head 7 is inserted into the transport unit 52, the insertion gear 0.25 and the transport gear 26 can normally engage with the first transport rack 23 or the second transport rack 24 by absorbing engagement errors.

Figure 21:
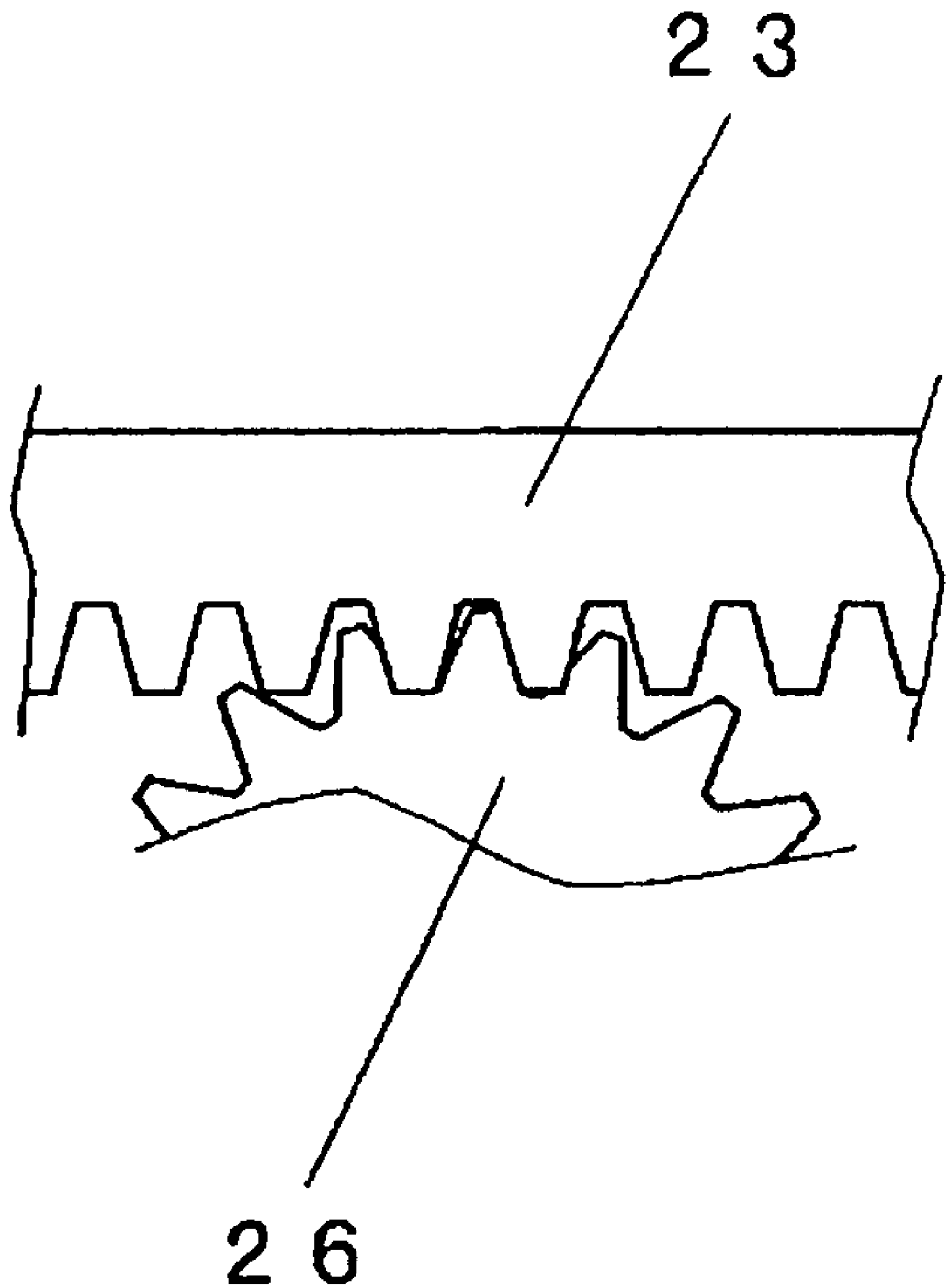
FIG. 21 is a diagram showing a state of engagement between the first transport rack and the transport gear.

The insertion gear 25 and the transport gear 26 are forced in each of a combination of the insertion gear 25 with the first transport rack 23 and second transport rack 24 and a combination of the transport gear 26 with the first transport rack 23 and second transport rack 24. For this reason, when the first transport rack 23 engages with the transport gear 26 as shown in FIG. 21 for instance, positions of the first transport rack 23 and the transport gear 26 are kept in the state of no backlash. Therefore, it is possible, without causing any loss to the engagement, to prevent any deviation from arising in the action of the first transport rack 23 following the rotation of the transport gear 26.

Figure 22:
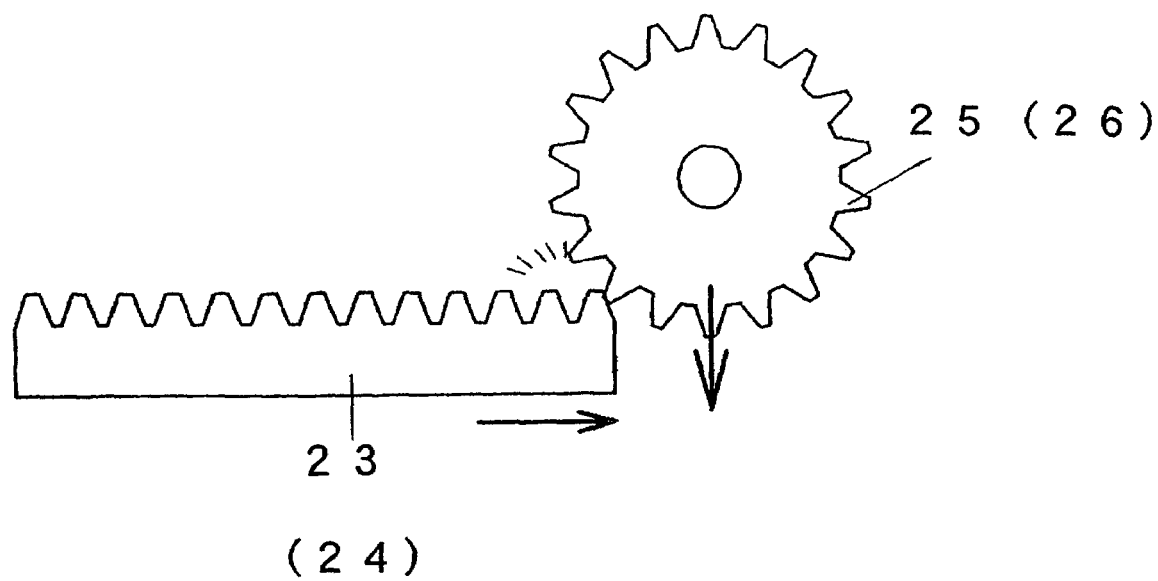
FIG. 22 is a diagram showing a state of inadequate engagement between the first transport rack and the transport gear.
Figure 23:
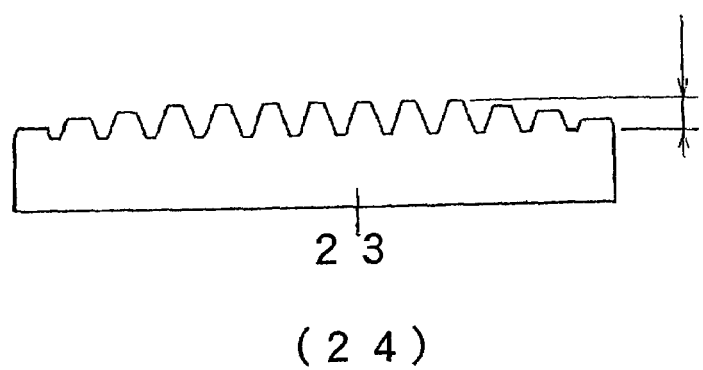
FIG. 23 is a diagram showing a deformed example of the first transport rack.
Figure 24:
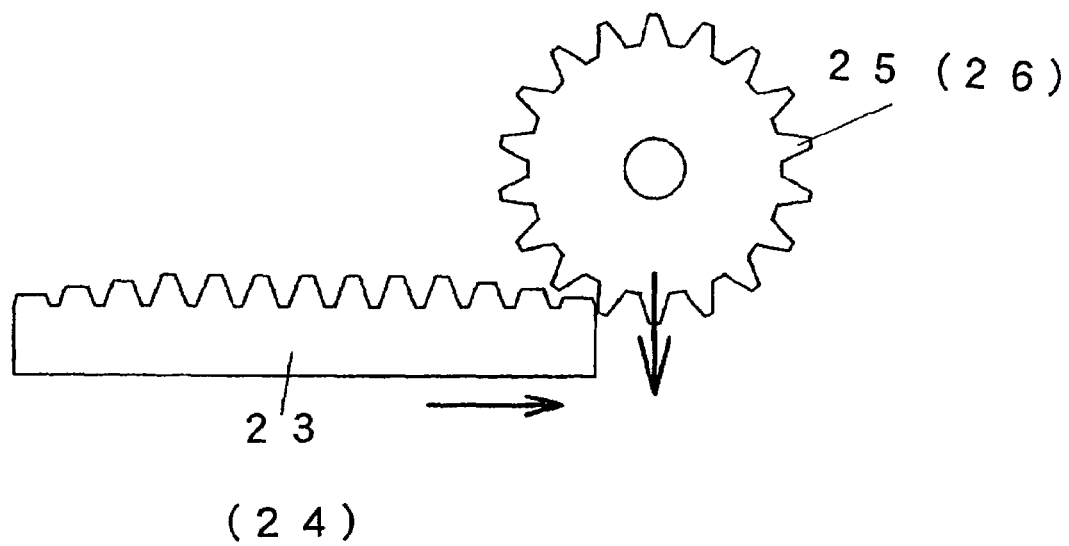
FIG. 24 is a diagram showing a state of engagement between the first transport rack shown in FIG. 23 and the transport gear.
Figure 25:
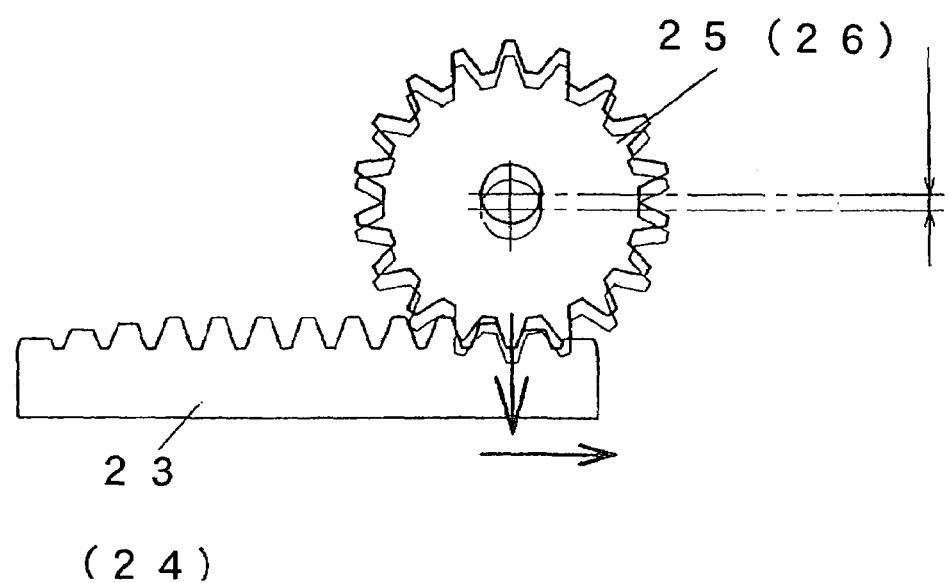
FIG. 25 is another diagram showing the state of engagement between the first transport rack shown in FIG. 23 and the transport gear.

When the first transport rack 23 or the second transport rack 24 engages with the insertion gear 25 or the transport gear 26, there are the cases where gear teeth of the insertion gear 25 or the transport gear 26 contact those of the first transport rack 23 or the second transport rack 24 as shown in FIG. 22 so as to generate a significant load respectively. To solve this problem, as shown in FIG. 23, it is desirable to form the gear teeth of each rack so that the tooth depth becomes larger in stages from the edge to the center at least at one end and preferably at both ends and reaches a normal tooth depth at the center of the first transport rack 23 and the second transport rack 24. As shown in FIG. 24, the tooth depth of the gear tooth of the first transport rack 23 (or second transport rack 24) contacting the insertion gear 25 (or transport gear 26) first becomes smaller by adopting this structure, and so the possibility of the gear tooth of the first transport rack 23 contacting that of the insertion gear 25 is reduced. Even if the gear teeth contact, the generated load is light because the tooth depth of the first transport rack 23 is small. As the load is applied to the insertion gear 25 by the springs 38 and 39, an adequate engagement state is maintained by the springs 38 and 39 even if the first transport rack 23 further engages with the insertion gear 25 and the tooth depth of the first transport rack 23 becomes larger (FIG. 25).

Figure 26:
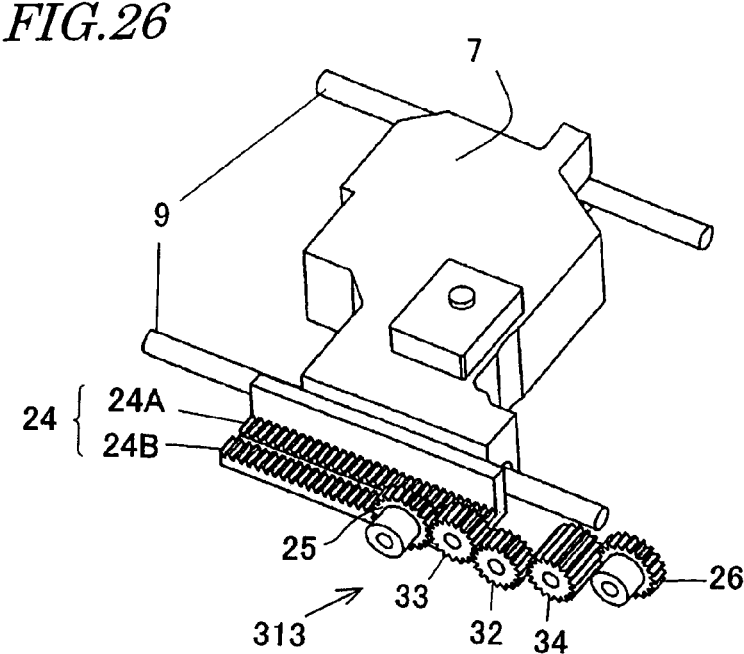
FIG. 26 is a perspective view showing a deformed example of the second transport rack.

The insertion gear 25 and the transport gear 26 are constituted to engage with the same portions of the first transport rack 23 and the second transport rack 24. However, it is also possible to have the insertion gear 25 and the transport gear 26 engage with different portions of the first transport rack 23 and the second transport rack 24. For instance, as shown in FIG. 26, it is also possible to divide the second transport rack 24 into a first portion 24A and a second portion 24B so that the transport gear 26 and the insertion gear 25 of the optical head insertion/removal and transport mechanism 312 engage only with the first portion 24A and second portion 24B respectively. In this case, it is desirable that the first portion 24A and second portion 24B should be comprised of two separate components to be independently replaced.

As the number of times of insertion and the number of times of transport are not necessarily equal as to each optical head, it is thereby possible to replace only the one suffering damage such as wear of the first portion 24A and second portion 24B according to the frequency of insertion or frequency of transport. In the case where the insertion gear 25 and the transport gear 26 engage with the same portions of the first transport rack 23 and the second transport rack 24, the damage to the first transport rack 23 and the second transport rack 24 depends on the total of the number of times of insertion and the number of times of transport. As opposed to this, in the case where the first transport rack 23 and the second transport rack 24 are divided into the first portion 24A and second portion 24B, the first portion 24A and a second portion 24B suffer no damage due to the insertion and transport respectively. For this reason, it is possible to curb degradation of the first transport rack 23 and the second transport rack 24.

Figure 27:
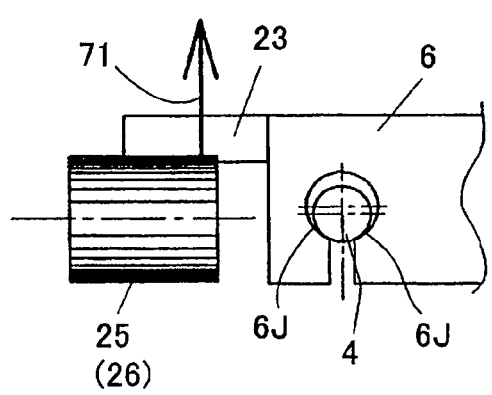
FIG. 27 is a sectional view for explaining how the first optical head moves along the guide structure.
Figure 28:
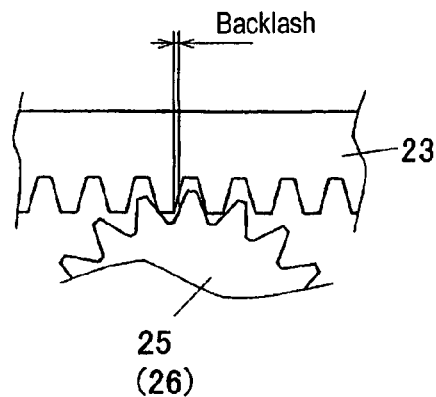
FIG. 28 is a diagram for describing the state of engagement between the first transport rack and the insertion gear.
Figure 29:
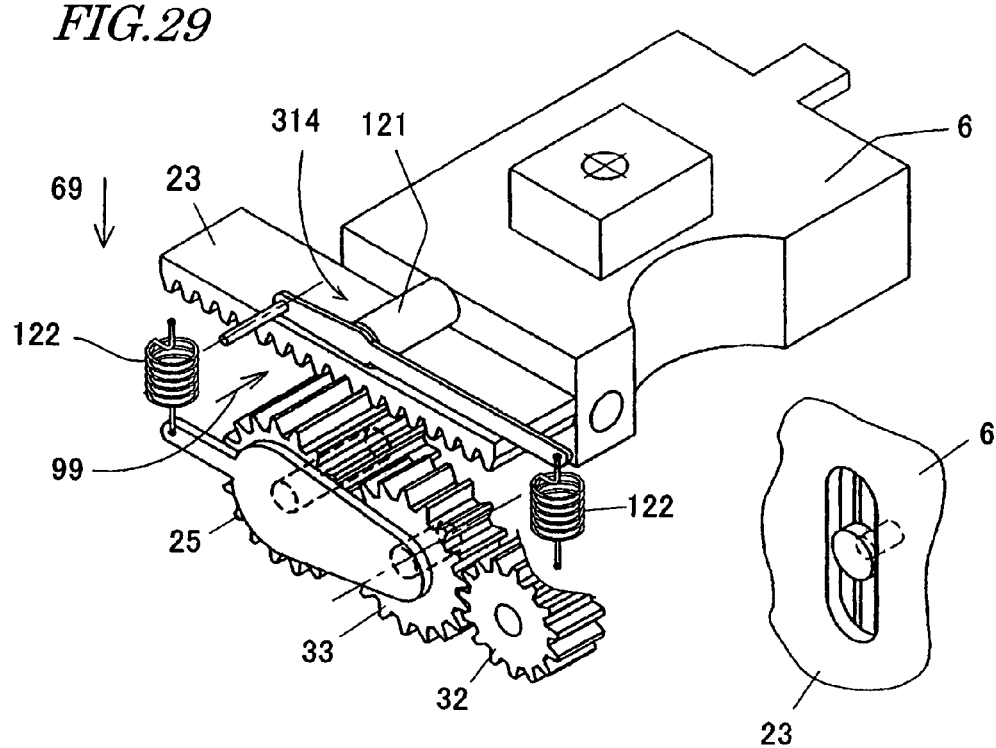
FIG. 29 is a perspective view showing an forcing mechanism.
Figure 30:
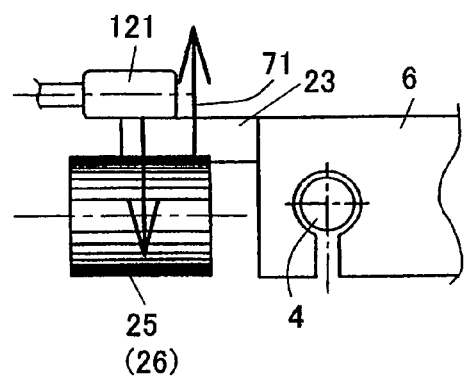
FIG. 30 is a sectional view for explaining how the first optical head moves along the guide structure in the case of providing the forcing mechanism.
Figure 31:
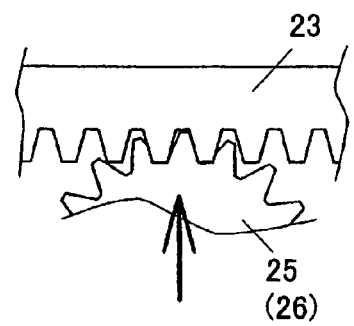
FIG. 31 is a diagram for describing the state of engagement between the first transport rack and the insertion gear in the case of providing the forcing mechanism.

As described by using FIGS. 17 and 19, in the case where the first transport rack 23 of the first optical head 6 engages with the insertion gear 25 and the transport gear 26, the insertion gear 25 and the transport gear 26 are forced in the directions of the arrows 99 and 101 by the insertion gear forcing spring 38 and the transport gear forcing spring 39. For this reason, as shown in FIG. 27, the first optical head 6 is forced in the direction of the arrow 71, and the receiving portion for receiving the guide structure 4 cannot evenly contact the guide structure 4 so that a significant load is imposed on the part of the receiving portion indicated by 6J. In this case, there is a possibility that the first optical head 6 cannot be smoothly and stably transported. To avoid such as problem, as shown in FIG. 29, there is provided an forcing mechanism 314 comprising an forcing member 121 having a rolling contact portion or a sliding contact portion such as a roller or a bearing and contacting the surface having no gear of the first transport rack 23 and a spring 122 for forcing the forcing member 121 in the direction of the insertion gear 25 and the transport gear 26 (direction of the arrow 69). The first transport rack 23 is mounted on the first optical head 23 in order to have a degree of freedom in the direction vertical to the moving direction of the first optical head 23. Although it is not shown, the same structure is provided in the neighborhood of the transport gear 26. As shown in FIG. 30, it becomes possible, by adopting such a structure, to have the portion of the first optical head 6 for receiving the guide structure 4 equally contact the guide structure 4 while keeping the adequate engagement state among the insertion gear 25, the transport gear 26 and the first transport rack 23. Thus, it becomes possible to transport the first optical head 6 stably along the guide structure 4.

Figure 32:
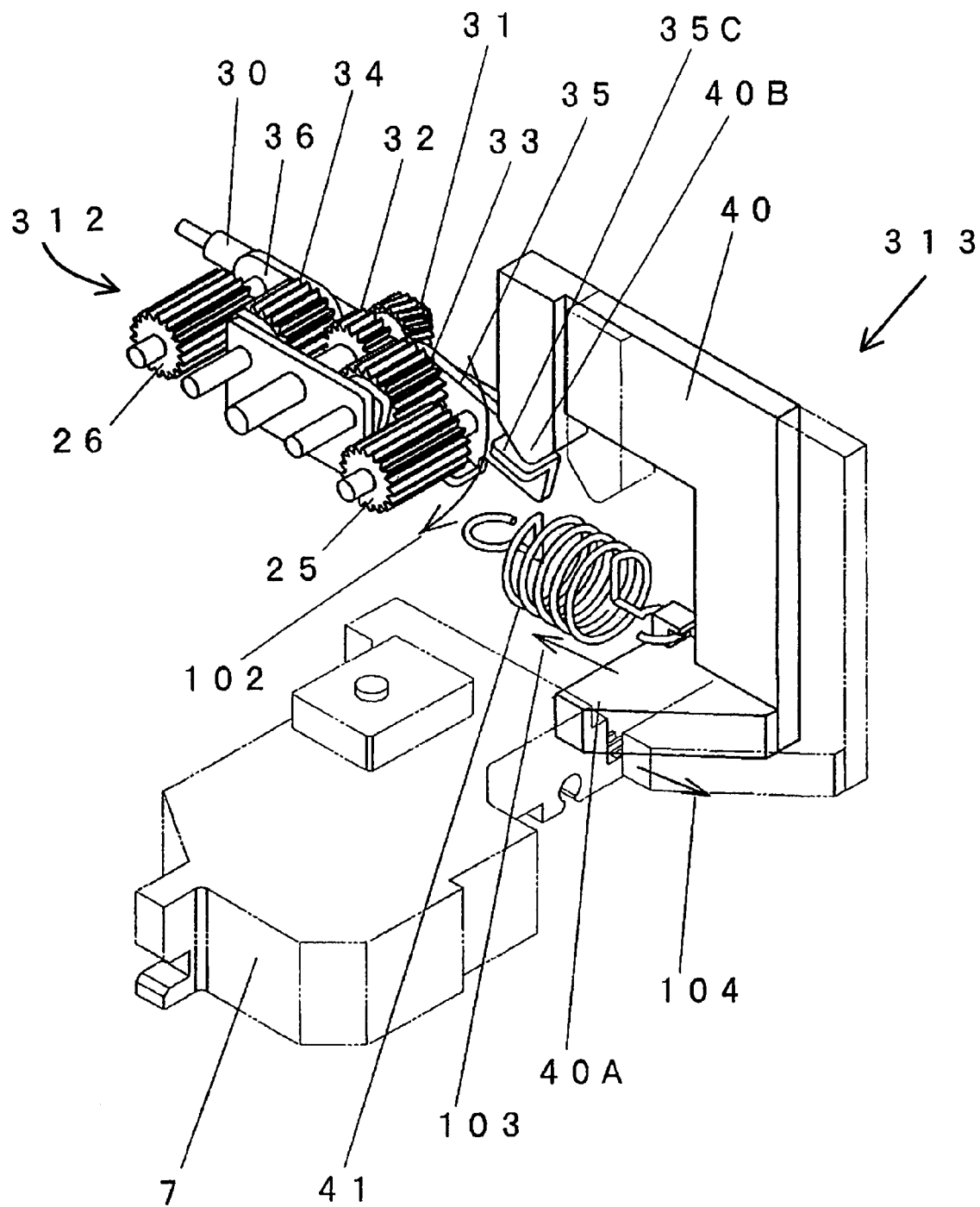
FIG. 32 is a perspective view showing an energization avoiding mechanism.

Next, an engagement avoiding mechanism 313 will be described by referring to FIG. 32. As shown in FIG. 32, the engagement avoiding mechanism 313 has an engagement avoiding lever 40. In the case where the second optical head 7 does not exist in the optical head storing portion 53, the engagement avoiding lever 40 forces an insertion gear holder forcing portion 35C of the insertion gear holder 35 in the direction of an arrow 102 so as to swing the insertion gear 25. The engagement avoiding lever 40 is forced in the direction of an arrow 103 by a lever spring 41. In FIG. 32, structures of the guide for guiding the engagement avoiding lever 40 in the forcing direction of the lever spring 41 (engagement avoiding guide) and so on are omitted.

As shown in FIG. 32, in the case where the second optical head 7 is in the optical head storing portion 53 (not shown), the second optical head 7 presses a lever forcing portion 40A of the engagement avoiding lever 40 in the direction of an arrow 104. Thus, as indicated in a chain double-dashed line, the engagement avoiding lever 40 moves so that a lever actuating portion 40B is positioned out of the insertion gear holder forcing portion 35C, and the insertion gear 25 keeps a neutral position capable of engaging with the first transport rack 23. For this reason, when the transport unit 52 ascends to the first position, the insertion gear 25 engages with the first transport rack 23, and the first optical head 6 can move to the transport unit 52.

At the second position, if the transport unit 52 receives the second optical head 7 from the optical head storing portion 53, a pressure of the lever forcing portion 40A is released. Consequently, as shown in full line in FIG. 32, the engagement avoiding lever 40 is dragged in the direction of the arrow 103 by the lever spring 41, and the lever actuating portion 40B forces the insertion gear holder forcing portion 35C in the direction of the arrow 102. Thus, the insertion gear 25 is pushed down in the direction of the arrow 102.

Therefore, even if the transport unit 52 ascends to the first position, the insertion gear 25 is pushed down so that the first transport rack 23 of the first optical head 6 stored in the optical head storing portion 53 does not engage with the insertion gear 25. To be more specific, in the case where the second optical head 7 is inserted into the transport unit 52, the driving force by the insertion gear 25 is not transmitted to the first optical head 6 in the optical head storing portion 53, and so unnecessary transport of the first optical head 6 can be avoided.

In the case of constituting the optical head insertion/removal and transport mechanism 312 by using a plurality of gears as described above, noise may be caused by the gears depending on their rotation and oscillation in the axial direction. To prevent occurrence of such noise or curb the noise, it is also possible to introduce an overload protector such as a friction clutch or a clamper in a part of a torque transmission system of each gear.

Next, the structure of the optical head will be described. As described above, the first optical head 6 and the second optical head 7 should at least have the configuration capable of engaging with the guide structure 4 in common. In this regard, it is thinkable to manufacture the first optical head 6 and the second optical head 7 dedicated to the optical disc apparatus 301 having the structure for engaging with the guide structure 4. It is not always necessary, however, to have each of the first optical head 6 and the second optical head 7 integrally formed. It is also feasible to have each of the first optical head 6 and the second optical head 7 constituted of a base portion capable of engaging with the guide structure 4 and an optical pickup portion placed on the base portion. In the case of such a structure, the optical pickup does not need to have the structure dedicated to the optical disc apparatus 301, and the optical pickup supporting another model may be used for the optical disc apparatus 301, for instance. It is thereby possible to reduce the costs as well.

Figure 33:
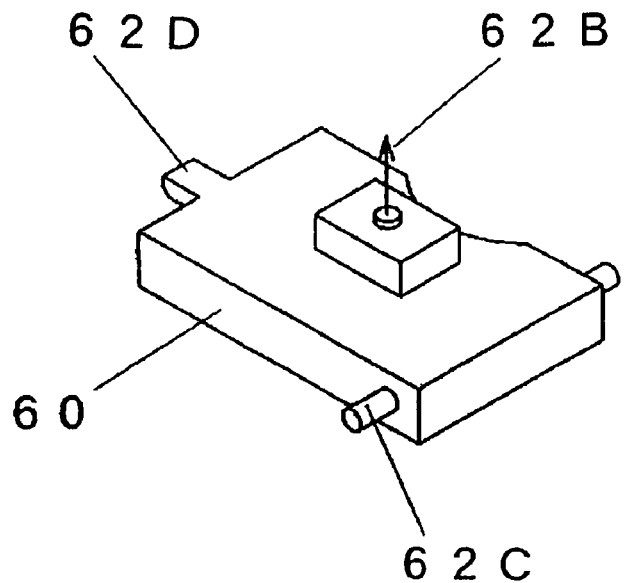
FIG. 33 is a perspective view showing an optical pickup of the first optical head.
Figure 34:
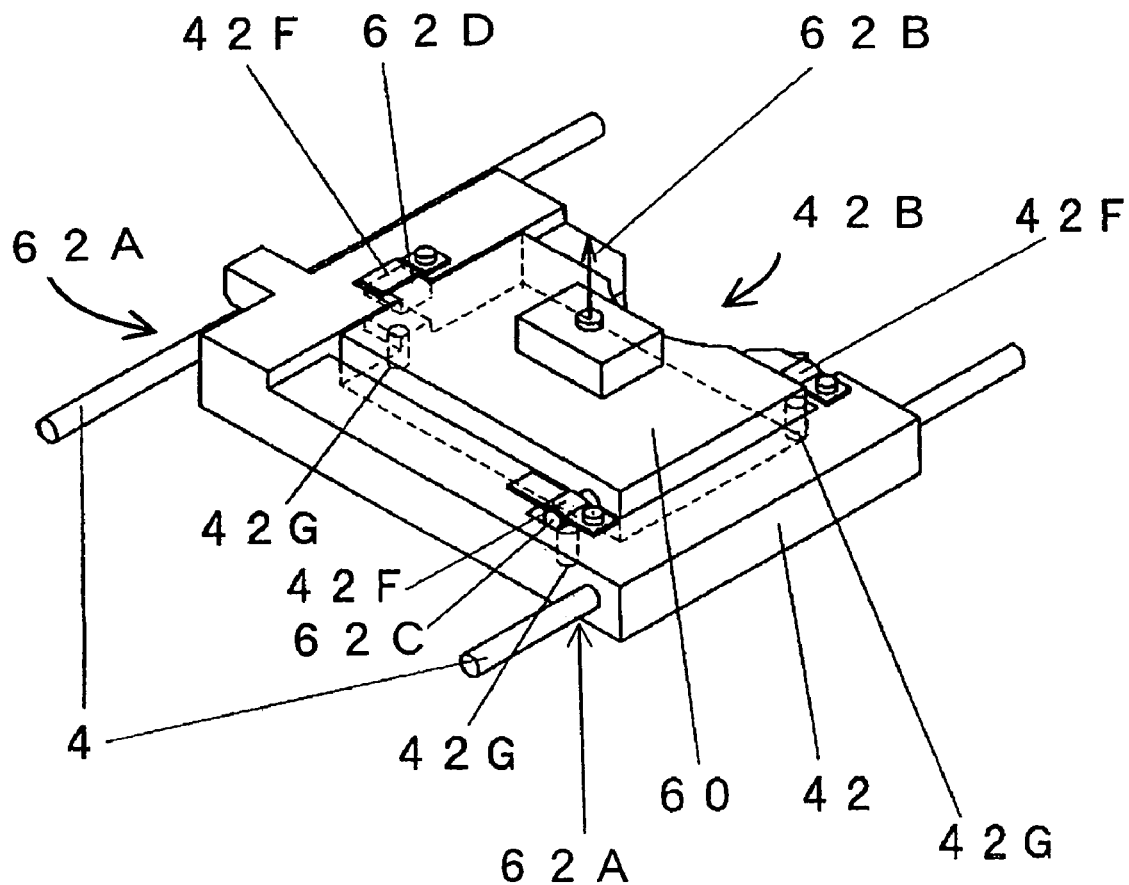
FIG. 34 is a perspective view showing a structure of the first optical pickup.

FIGS. 33 and 34 are examples of such an optical head, and the first optical head 6 is comprised of an optical pickup 60 and an adapter 42. The optical pickup 60 comprises a first projection 62D and a pair of second projections 62C, and emits a light beam 62B. The first projection 62D has a receiving portion for receiving a sub-guide in the case of using the optical pickup 60 alone as the optical head. The second projection 62C is a guide shaft inserted into the receiving portion for receiving a main guide provided to the optical pickup 60.

As shown in FIG. 34, the adapter 42 has a guide receiving portion 62A for engaging with the guide structure 4 and a concave portion 42B for receiving the optical pickup 60 so as to have the optical pickup 60 stored in the concave portion 42B. An forcing blade spring 42F is pressing the optical pickup 60 against the bottom side of the concave portion 42B at the first projection 62D and second projection 62C of the optical pickup 60. The adapter 42 has adjustment screws 42G for pushing up the optical pickup 60 against the forcing blade springs 42F provided thereon to be capable of contacting the first projection 62D and the pair of second projections 62C respectively. The three forcing blade springs 42F and three adjustment screws 42G may be either in the same shape or in different shapes respectively. The adjustment screws 42G do not necessarily have to be provided at the positions capable of contacting the first projection 62D and the pair of second projections 62C, but may also be provided at the positions capable of contacting the optical pickup 60 in the neighborhood of the first projection 62D and the pair of second projections 62C.

On the first optical head 6 shown in FIG. 34, the adjustment screws 42G are turned to adjust the position of the optical pickup 60 against the adapter 42 for the sake of adjusting the inclination of the guide shaft 4 and an optical axis 62B of the light beam emitted from the optical pickup 60. As shown in FIG. 34, the optical pickup 60 is supported only by the adjustment screws 42G, and so it is possible to adjust the height of the optical pickup 60 against the adapter 42 in addition to the adjustment of the optical axis 62B.

Figure 35:
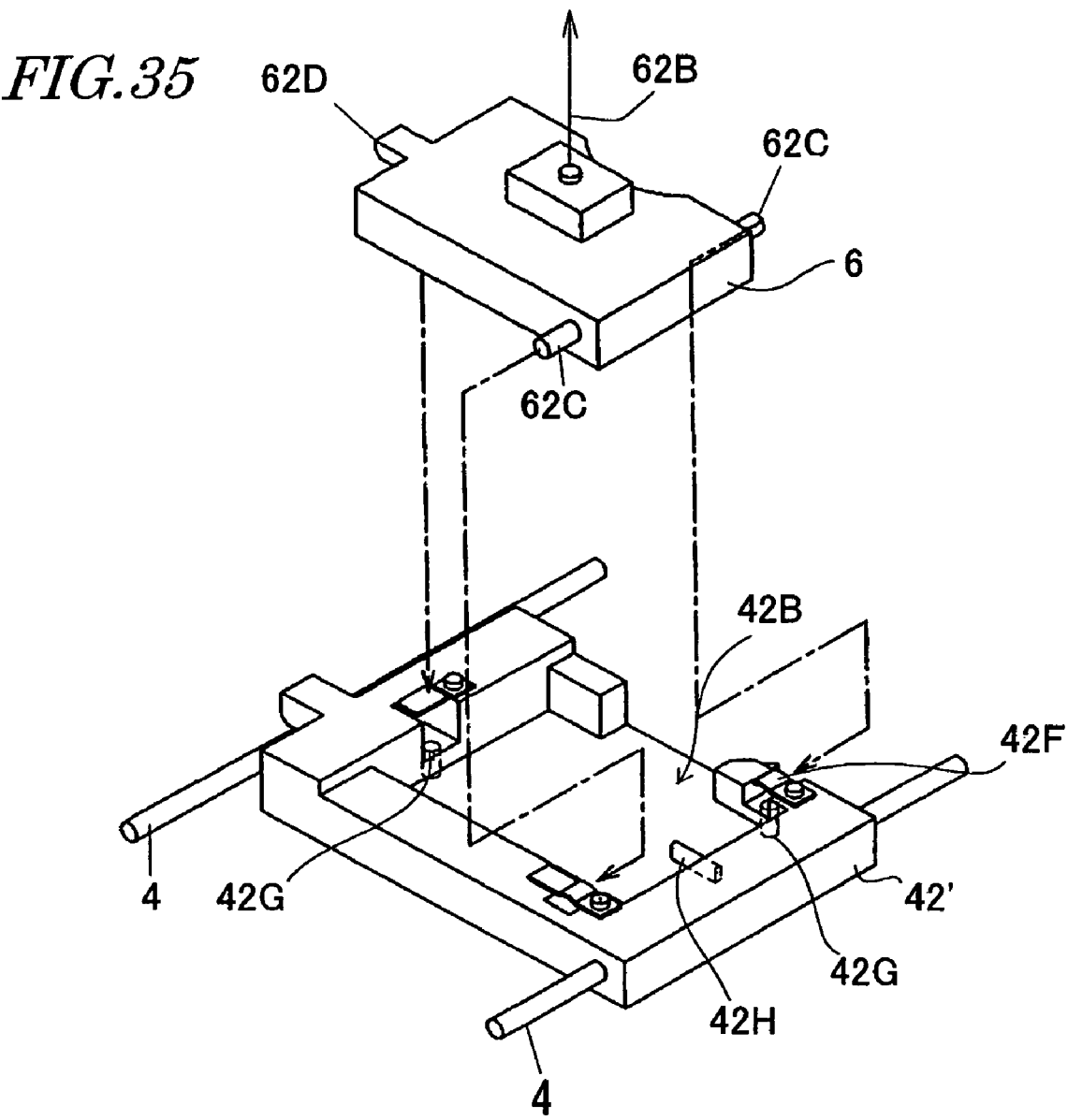
FIG. 35 is a perspective view showing a structure of a deformed example of the first optical head.

If it is not necessary to adjust the height of the optical pickup 60 against the adapter 42, it is possible to adjust the optical axis 62B by using two adjustment screws 42G. On the first optical head 6 shown in FIG. 35, the adapter 42' has a projection 42H at the bottom of the concave portion 42B. The projection 42H is positioned approximately in the middle of a pair of concave portions for receiving the pair of second projections 62C of the optical pickup 60, and contacts the bottom of the optical pickup 60 when the optical pickup 60 is inserted into the concave portion 42B. The adjustment screws 42G are only provided below the first projection 62D and below one of the pair of second projections 62C. On turning the adjustment screw 42G provided to the second projection 62C, the optical pickup 60 inclines in the concave portion 42B by using the projection 42H as a supporting point. For this reason, it is possible to adjust the inclination of the optical axis 62B against the guide structure 4 as with the first optical head 6 in FIG. 34. According to the structure shown in FIG. 34, it is possible to decrease the number of the adjustment screws 42G. Therefore, it is feasible to reduce the work for adjusting the optical axis of the light beam emitted from the optical head and facilitate the adjustment work.

According to the above embodiment, the rotation axes of the insertion gear 25 and the transport gear 26 of the optical head insertion/removal and transport mechanism 312 are horizontally placed. It is also possible, however, to vertically place the rotation axes of the insertion gear 25 and the transport gear 26.

Figure 36:
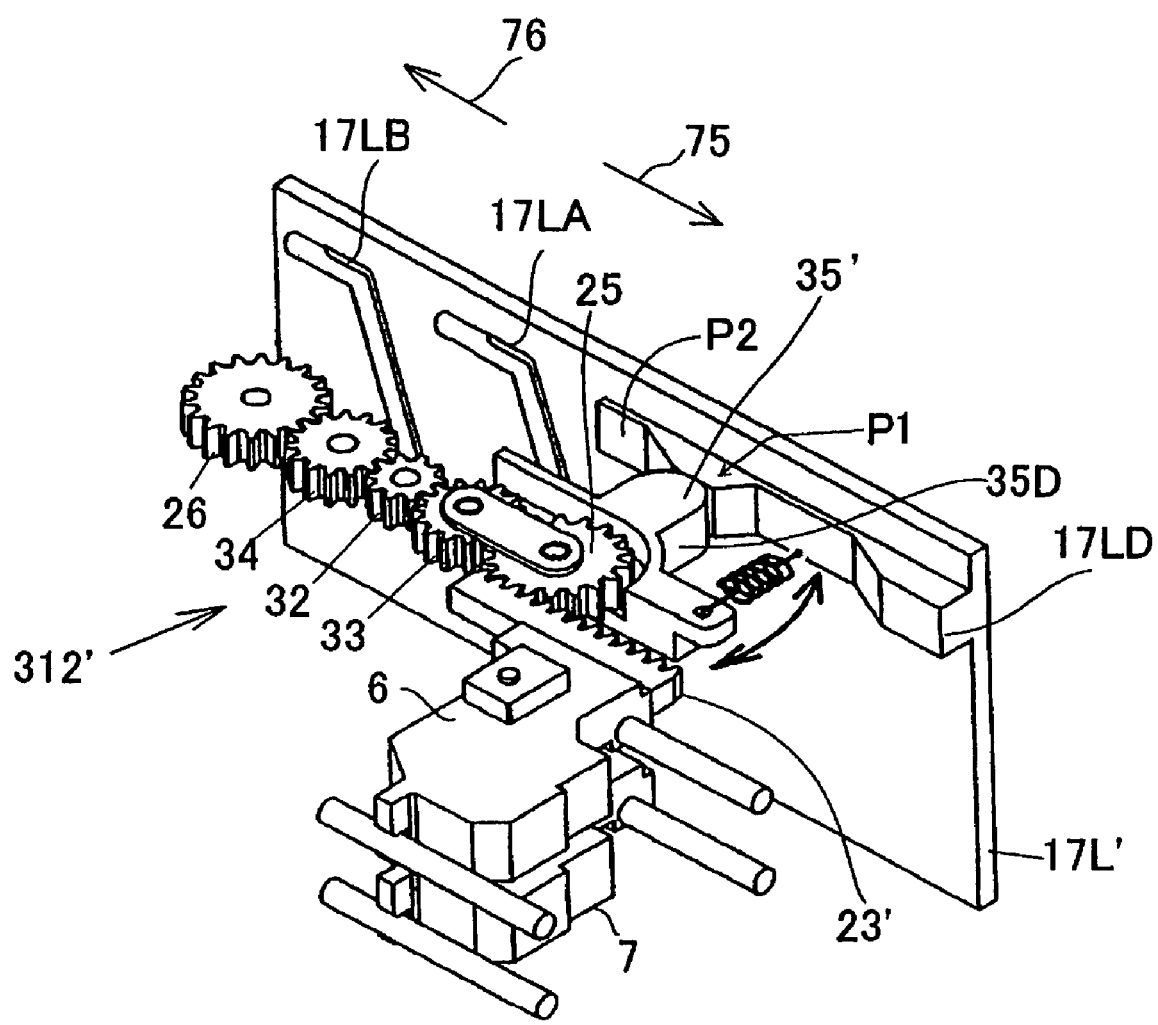
FIG. 36 is a perspective view showing a deformed example of the optical head insertion/removal and transport mechanism.
Figure 37:
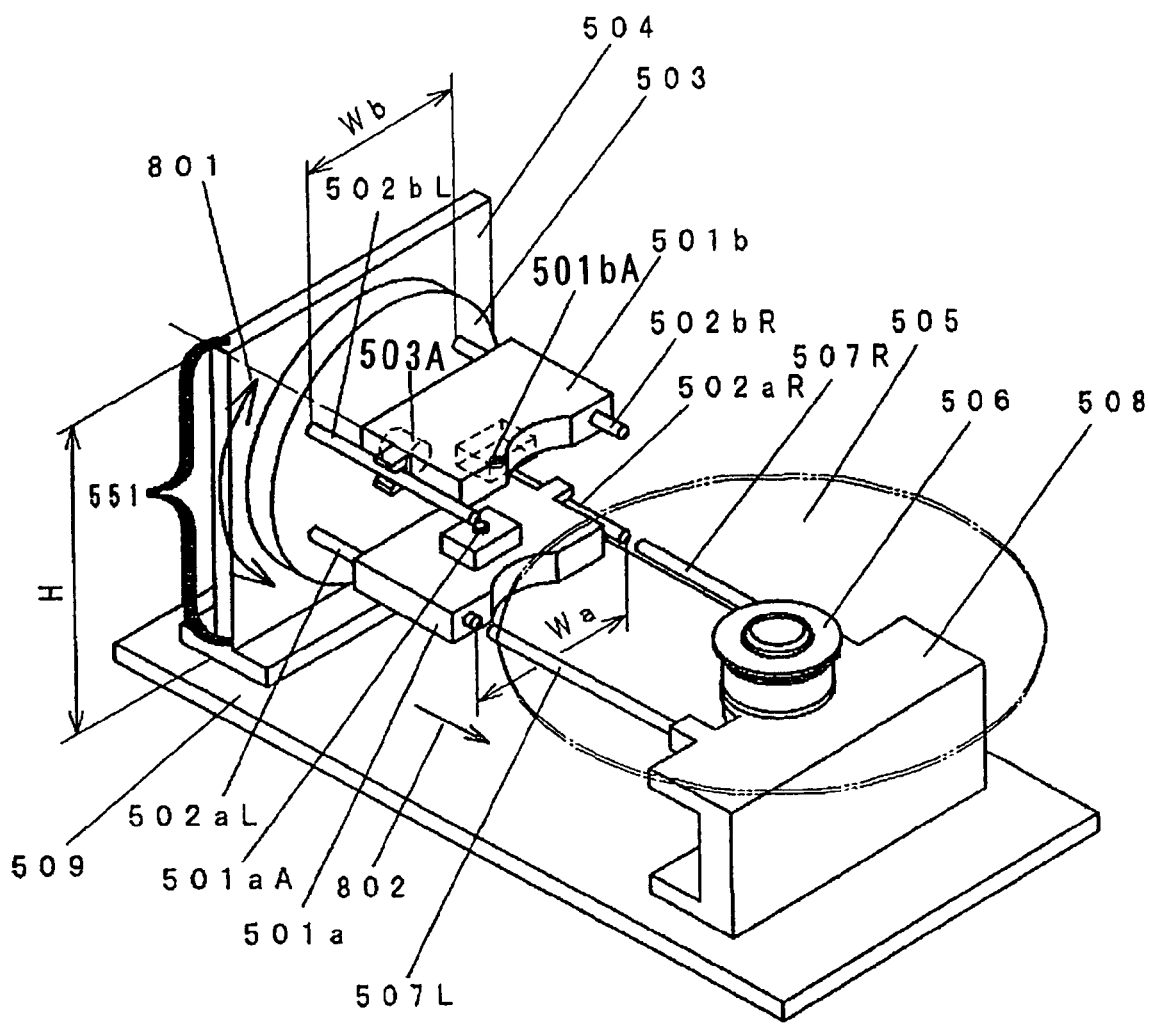
FIG. 37 is a perspective view showing a conventional optical disc apparatus in the past having a plurality of optical heads.
Figure 38:
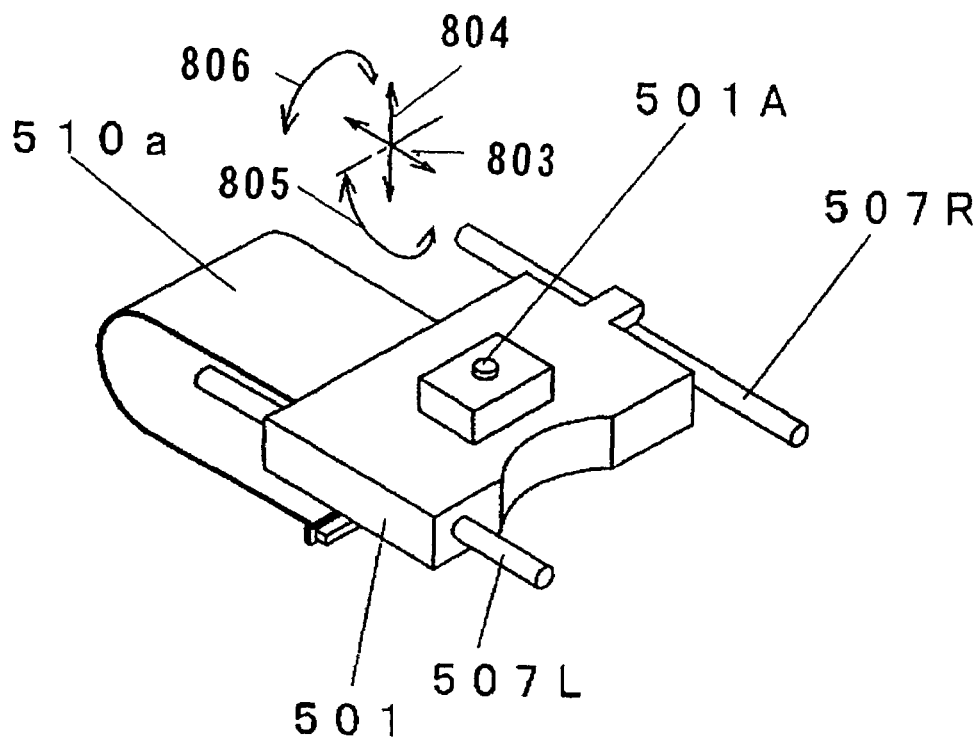
FIG. 38 is a perspective view showing a feeder line or a signal line to the optical head used for the optical disc apparatus in FIG. 37.
Figure 39:
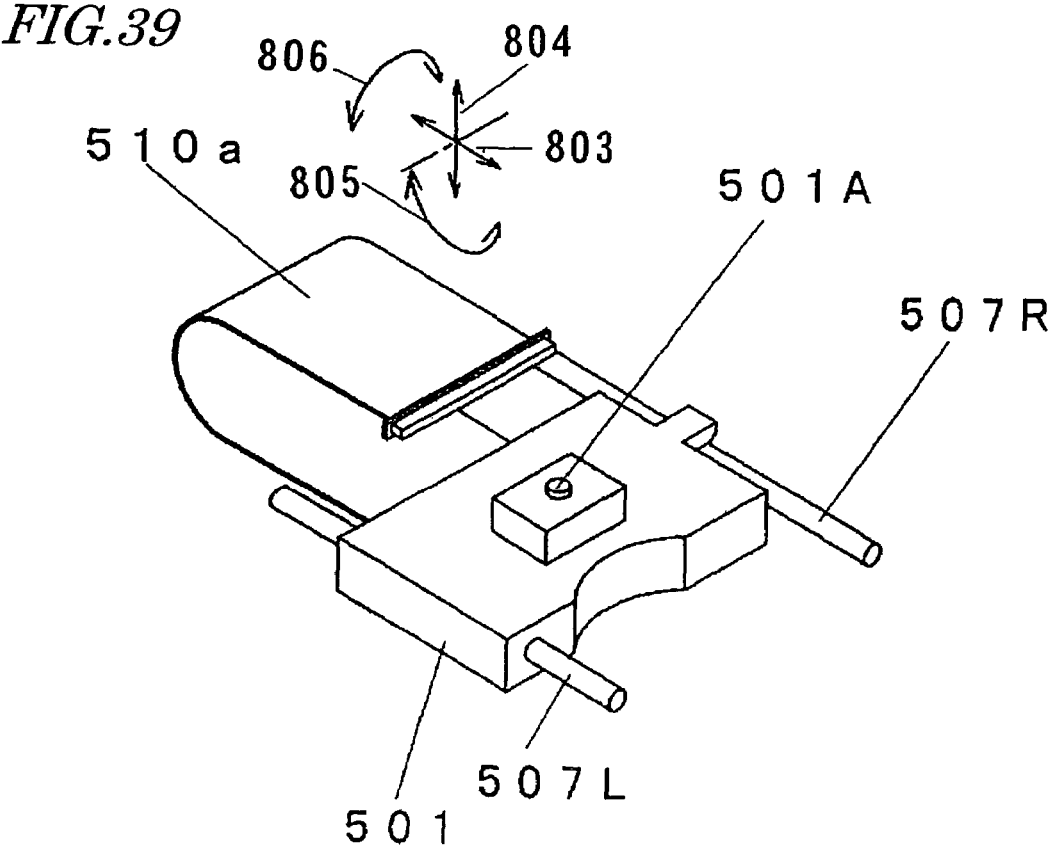
FIG. 39 is a perspective view showing the feeder line or the signal line to another optical head used for the optical disc apparatus in FIG. 37.

As shown in FIG. 36 for instance, it is also possible to provide to the transport unit 52 the optical head insertion/removal and transport mechanism 312 having the insertion gear 25 and the transport gear 26 of which rotation axes are vertically placed. In this case, the first transport rack 23' and the second transport rack (not shown) for engaging with the insertion gear 25 and the transport gear 26 of the optical head insertion/removal and transport mechanism 312' are provided on the side surfaces of the first optical head 6 and the second optical head 7. As with the above embodiment, it adopts the structure capable of swinging the insertion gear 25 about the rotation axis of the insertion intermediate gear 33, and provides a cam follower 35D to the insertion gear holder 35'. A cam 17LD for engaging with the cam follower 35D when the transport unit 52 is at the first position is provided to the elevating cam 17L. An forcing mechanism 35E such as a spring is provided so that the cam follower 35D contacts the cam 17LD. Although it is not shown in FIG. 36, a cam for engaging with the cam follower 35D when the transport unit 52 is at the second position is also provided to the elevating cam 17L.

According to such a structure, the first transport rack 23' and the second transport rack horizontally engage with the insertion gear 25 and the transport gear 26. At this time, the positional relationship among the insertion gear 25, the transport gear 26 and the first transport rack 23' is equal to the positional relationship among the insertion gear 25, the transport gear 26 and the second transport rack, and the first transport rack 23' and the second transport rack can engage on the same condition as the insertion gear 25 and the transport gear 26. Thus, it is possible to stabilize the transport of the first optical head 6 and the second optical head 7.

It is also possible, with the cam follower 35D provided to the insertion gear holder 35' and the cam 17LD provided to the elevating cam, to swing the insertion gear 25 by about the rotation axis of the insertion intermediate gear 33. Therefore, it is possible, by appropriately designing the form of the cam 17LD, to adjust the engagement state between the insertion gear 25 and the first transport rack 23.

It is also feasible to constitute it so that the cam 17LD and the cam follower 35D will also function as the engagement avoiding mechanism. In particular, horizontal portions of the cam grooves 17LA and 17LB provided to the elevating cam 17L are extended so that, when the transport unit 52 is at the first position, the cam follower 35D of the optical head insertion/removal and transport mechanism 312' can be in the state of contacting a first portion P1 of the cam 17LD and in the state of contacting a second portion P2 thereof.

In the case where the first portion P1 of the cam 17LD contacts the cam follower 35D, the insertion gear 25 is placed at the position for engaging with the first transport rack 23'. And in the case where the second portion P2 of the cam 17LD contacts the cam follower 35D, the insertion gear 25 is placed at the position for not engaging with the first transport rack 23'.

And a detector for detecting whether or not the second optical head 7 is stored in the second storage support guide 9 of the optical head storing portion 53 or a detector for detecting whether or not the second optical head 7 is stored in the transport unit 52 is provided.

The optical disc apparatus is controlled as follows by using such a structure. In the case where the second optical head 7 is not inserted in the transport unit 52, the detector provided to the transport unit 52 or the detector provided to the optical head storing portion 53 detects that the second optical head 7 is not inserted in the transport unit 52. In this case, the transport unit 52 is moved to the first position so that the first portion P1 of the cam 17LD contacts the cam follower 35D. The insertion gear 25 is at the position for engaging with the first transport rack 23', and so it is possible to insert the first optical head 6 into the transport unit 52 with the optical head insertion/removal and transport mechanism 312'.

If the second optical head 7 is inserted in the transport unit 52, the detector provided to the transport unit 52 or the detector provided to the optical head storing portion 53 detects the second optical head 7 is inserted in the transport unit 52. In this case, the transport unit 52 is moved to the first position so that the second portion P2 of the cam 17LD contacts the cam follower 35D. The insertion gear 25 is at the position for not engaging with the first transport rack 23', and so it will not move the first transport rack 23' of the first optical head 6 even if it moves the second optical head 7 already inserted into the transport unit 52 by the optical head insertion/removal and transport mechanism 312'. Thus, in the case where the second optical head 7 is inserted into the transport unit 52, it is possible to avoid engagement with the first transport rack 23' of the first optical head 6.

As described above, the optical disc apparatus according to this embodiment can record and/or reproduce the data either on a bare disc or the disc in the form accommodated in the cartridge such as a DVD-RAM. To handle the disc accommodated in the cartridge, however, it is necessary to position the cartridge on the transport base 5. Accordingly it is desirable to provide a positioning member for that purpose on the transport base 5 or other portions. There is no particular limit to the size of the bare disc or the disc accommodated in the cartridge.

In the case where the forms of the cartridges for accommodating the optical discs corresponding to a plurality of optical heads are different, retention mechanisms supporting the forms of the respective cartridges are necessary. Especially, in the case where the positions for positioning are different, it is necessary to have a switching mechanism for switching the positioning members corresponding to them respectively. For instance, it is possible, as such a mechanism, to identify the differences in the outside shapes of the cartridges with a sensor or mechanically and switch the positioning members.

In the case where the optical disc is accommodated in the cartridge, a shutter for exposing the disc surface is provided to the cartridge. Therefore, when recording and/or reproducing the data on the disc accommodated in the cartridge, it is necessary to provide a mechanism for opening and closing the shutter to the optical disc apparatus according to the present invention. Such a mechanism for opening and closing the shutter is in the public domain as the one adopted on a disc drive for mini discs and DVD-RAMs, for instance. In the case where shutter forms of the cartridges supporting a plurality of optical heads respectively are different, the mechanisms for opening and closing the shutters supporting the respective cartridges are required. In the case where the positions for opening and closing operations of the shutters are close, it is possible to provide a common mechanism for opening and closing the shutters. It is also possible to synchronize the mechanisms for opening and closing the shutters to the operation of inserting the cartridge, that is loading, or to provide the mechanism for opening and closing the shutters in conjunction with a loading mechanism.

The optical disc apparatus according to this embodiment uses the optical head insertion/removal and transport mechanism driven by the gears as a drive structure used for moving between the transport unit 52 and the optical head storing portion 53 and also as the drive structure in the case where the optical head records and/or reproduces the data on the optical disc 1. It is also possible, however, to use the drive mechanism other than the gears, such as the one using a timing belt at least as a part of it. Furthermore, it adopted a rack-and-pinion method as the drive by the gear. It is also possible, however, to have the same effect by adopting a screw feeding method using lead screws.

According to the optical disc apparatus of this embodiment, the first transport rack 23 and the second transport rack 24 have a tooth form of a tooth trace in the direction orthogonal to the direction guided by the guide shaft 4, and the optical head is transported by the insertion gear 25 and the transport gear 26 engaging therewith. It is also possible to have the same effect even if the tooth trace direction of the first transport rack 23 and the second transport rack 24 is constituted otherwise.

The insertion gear forcing spring 38 or the transport gear forcing spring 39 which is a torsion coil spring is used as the method of forcing the insertion gear 25 to the first transport rack 23 or the second transport rack 24. It is also possible, however, to use another forcing mechanism if it is the configuration in which an forcing force is not generated at the swinging center position but is generated when displaced from the upside or downside.

The mechanism for eliminating a backlash in the engagements between the insertion gear 25 or the transport gear 26 and the first transport rack 23 and the second transport rack 24 is adopted. However, it is also possible, in other engagement portions such as the one between the transport gear 26 and the transport intermediate gear 34, to further improve transport accuracy by using the backlash eliminating mechanism in the public domain.

The insertion intermediate gear 33 and the transport intermediate gear 34 are used for the optical head insertion/removal and transport mechanism. It is also possible to have the same effect by omitting these gears in consideration of spatial constraints and constraints of required structures and so on and directly engaging the central gear 32 with the insertion gear 25 and the transport gear 26.

According to the optical disc apparatus of this embodiment, the first optical head is comprised of the adapter 42 and the optical pickup 60 which is smaller than the adapter 42. However, any adapter adaptable to the guide shaft 4 may be used, and the optical pickup 60 may also be larger than the adapter 42. And a shaft 62C of the optical pickup 60 may also be integrally formed with the optical pickup 60. The optical pickup 60 may also have the receiving portion for directly receiving one of the two shafts of the guide structure 4.

The plurality of optical heads are stored in the optical head storing portion in vertical arrangement. However, they may also be stored in the optical head storing portion in horizontal arrangement. Furthermore, while one of the optical heads is inserted into the transport unit 52 and contributing to the recording or reproduction in the state of having the optical heads stored in the optical head storing portion 53, operational oscillation is transmitted to the entire apparatus by rotary movement of the disc motor 2 or transport movement of the optical head itself. There is a possibility that operational oscillation may be extended to the optical head storing portion 53 so as to cause unnecessary resonance to the stored optical head. In this case, the resonance of the apparatus may be amplified and have negative effects on the recording or reproduction. It may also lead to the damage to the optical head stored in the optical head storing portion 53. For this reason, it is preferable, in the state of having the optical heads stored in the optical head storing mechanism 53, to eliminate the degree of freedom for the first storage support guide 8 or the second storage support guide 9 of each optical head. For instance, it is desirable to provide a degree-of-freedom eliminating member for fixing or forcing the first optical head 6 or the second optical head 7 on the first storage support guide 8 or the second storage support guide 9.

The optical disc apparatus according to the present invention comprises the plurality of optical heads, and is able to switch them appropriately and simply as required to the state capable of recording or reproducing on the optical disc. For instance, it is able to record or reproduce the data on the optical disc by a plurality of methods with the optical heads supporting the respective methods and also comprise a spare optical head for the cases where a normally used optical head becomes unusable due to a failure, etc.

The transport unit or the optical head storing portion mutually and relatively moves in the direction orthogonal to the direction in which the optical heads are guided by a guidance mechanism so that the optical heads and the optical head storing mechanism do not rotate on selecting a desired optical head. Therefore, the feeder line and signal line to the optical heads can adequately curve, and so it is possible to simply have the configuration not imposing an unreasonable mechanical load on the lines. It is also possible to design the height of the optical disc apparatus independently of a horizontal dimension of the optical head.

When inserting a specific optical head into the position capable of recording or reproducing, it is possible, just by inserting the transport unit along the guidance mechanism, to substantially transport the optical axis of the optical head radially on the mounted optical disc. For this reason, it is possible to record or reproduce the data on the optical disc without moving the optical axis to a circumferential component of the optical disc.

When transporting one of the plurality of optical heads between the optical head storing portion and the transport unit at the position capable of recording or reproducing, it is possible to improve speed of optical head switching operation.

As the driving source on inserting each optical head into the transport unit from the optical head storing mechanism and the driving source on transporting each optical head after inserting it into the transport unit are common, the driving source such as a motor can satisfy both the functions alone. Therefore, it is possible to cut down on the number of components and the costs.

The rack is provided to each optical head, and there are provided the gears engaging therewith for inserting each optical head into the transport unit from the optical head storing mechanism and the transport gear for transporting each optical head by the transport unit so as to transmit the driving forces to the optical heads respectively. For this reason, it is possible to connect a driving force transmission system of a selected specific optical head among the plurality of optical heads stored in the optical head storing mechanism smoothly in a simple configuration, and shift from the operation of inserting each optical head into the transport unit from the optical head storing mechanism to the transport operation in the transport unit.

According to the optical disc apparatus of the present invention, it is possible to maintain a stable engagement state by absorbing errors due to engagement variations between the transport rack and the insertion gear or the transport gear of each optical head. It is also possible to eliminate the clearance, that is, the backlash between the teeth in the engagement between any transport rack and any insertion gear or any transport gear. For this reason, it is possible to reduce the errors of each optical head following the movement of the driving source in the transport direction on the insertion or transport.

According to the optical disc apparatus of the present invention, it is possible to avoid the engagement between the transport rack of another optical head and the insertion gear so as not to move the other optical head in the state of having the optical head inserted into the transport unit and capable of recording or reproducing on the optical disc.

According to the optical disc apparatus of the present invention, it is possible to place and use another optical head on the adapter conforming to the guide structure consistent only with the specific optical head even if all the plurality of optical heads do not comprise the receiving portions mutually capable of the guidance by the common guide structure. For instance, it is possible to use without any problem the optical head supporting another model but not conforming to the guide structure consistent with the specific optical head.

According to the optical disc apparatus of the present invention, it is possible to correct the inclination in the case where the inclination between the guide structure consistent only with the specific optical head and the optical axis of the optical head placed on the adapter is not correct.

According to the optical disc apparatus of the present invention, it is also possible, while storing the optical head in the optical head storing portion, to have each optical head contact an inner wall of the cabinet directly or via an inclusion so as to emit heat generated by each optical head. Furthermore, it is also possible, at the position where the first optical head 6 or the second optical head 7 is stored, to provide a cover for covering the lenses or optical system members to be added to the optical heads so as to prevent an undesired substance such as the dust from adhering to them during the storage.

INDUSTRIAL APPLICABILITY

According to the present invention, it is possible to provide the optical disc apparatus capable of reducing the height of the entire apparatus and connecting the feeder line and the signal line so as not to exert an unreasonable force on a plurality of optical heads. Therefore, it is possible, for instance, to implement the optical disc apparatus capable of recording and/or reproducing on the optical disc by a plurality of methods with the optical heads supporting the respective methods and also the optical disc apparatus comprising a spare optical head for the cases where a normally used optical head becomes unusable due to a failure or the like.

The invention claimed is:

1. An optical disc apparatus comprising:
   a disc rotation mechanism for placing and rotating a disc;
   a plurality of optical heads for emitting light beams for recording and/or reproducing data on the optical disc;
   a transport unit including a guide structure for guiding the optical heads to be radially transportable on the disc, an optical head transport mechanism for transporting the optical heads along the guide structure, and a transport base for supporting the disc rotation mechanism, the guide structure and the optical head transport mechanism;
   an optical head storing portion having a plurality of storage support guides for supporting and storing each of the plurality of optical heads; and
   an optical head insertion and removal mechanism for transporting each of the optical heads from the optical head storing portion to the transport unit or from the transport unit to the optical head storing portion, and wherein:
   each optical head stored in the optical head storing portion is transported to the transport unit by linearly moving from a position at which it is stored.

2. The optical disc apparatus according to claim 1, wherein the plurality of optical heads are stored in the optical head storing portion in an attitude to emit the light beams respectively in the same direction.

3. The optical disc apparatus according to claim 2, wherein the storage support guides are vertically arranged so that an optical axis of light beams emitted from the plurality of optical heads supported by the storage support guides and a rotation axis of a disc rotation mechanism are substantially on the same plane in the optical head storing portion.

4. The optical disc apparatus according to claim 3, wherein the apparatus records and/or reproduces data on the optical disc placed on the disc rotation mechanism in a state of having relative positions of the optical head storing portion and the transport unit set up in order to insert one of the plurality of optical heads stored in the optical head storing portion into the transport unit.

5. The optical disc apparatus according to claim 1, wherein the optical head insertion and removal mechanism is provided to the transport unit, and the optical head insertion and removal mechanism and the optical head transport mechanism share a single driving source.

6. The optical disc apparatus according to claim 5, wherein each of the plurality of optical heads has a transport rack having a tooth form of a tooth trace in a direction orthogonal to a direction guided by the guide structure, and each of the optical head insertion and removal mechanism and the optical head transport mechanism has an insertion gear and a transport gear capable of engaging with the transport rack of each optical head, and in the case where the transport unit and the optical head storing portion are at the positions capable of inserting or ejecting one of the plurality of optical heads stored in the optical head storing portion, the transport rack of the one optical head engages with the insertion gear and the one optical head is inserted into the transport unit from the optical head storing portion so that, in the transport unit, the transport rack of the one optical head engages with the transport gear so as to transport the one optical head along the guide structure.

7. The optical disc apparatus according to claim 6, wherein a rotation center of at least one of the insertion gear and transport gear swings to change a distance from the transport rack of the optical head, and the optical head insertion and removal mechanism or the optical head transport mechanism has a gear forcing mechanism for, of the insertion gear or the transport gear, forcing the gear of which rotation center swings to the transport rack side.

8. The optical disc apparatus according to claim 7, wherein the optical head insertion and removal mechanism or the optical head transport mechanism has a preliminary gear for driving the swinging gear, and the swinging gear swings by using the rotation center of the preliminary gear as a spindle.

9. The optical disc apparatus according to claim 7, further comprising an forcing means with a rolling contact portion or a sliding contact portion for causing a surface having no gear of the transport rack to contact with the rolling contact portion or sliding contact portion and forcing the transport rack in the direction of the insertion gear or the transport gear, wherein the transport rack has a degree of freedom for moving in the direction orthogonal to the guiding direction of the optical head.

10. The optical disc apparatus according to claim 6, wherein the plurality of optical head transport racks have gear teeth of which tooth depth becomes larger in stages from an edge to the center at least in the neighborhood of one end and reaches a normal tooth depth at the center.

11. The optical disc apparatus according to claim 6, wherein an area in which the insertion gear engages with the transport rack is different from the area in which the transport gear engages with the transport rack.

12. The optical disc apparatus according to claim 11, wherein the area in which the transport rack engages with the insertion gear and the area in which it engages with the transport gear are comprised of independent components.

13. The optical disc apparatus according to claim 3, wherein the plurality of optical heads include a first optical head and a second optical head, and the plurality of storage support guides of the optical head storing portion include a first storage support guide and a second storage support guide for supporting the first optical head and second optical head, where the first storage support guide is positioned higher than the second storage support guide.

14. The optical disc apparatus according to claim 13, further comprising a transport unit elevator for moving the transport unit to a first position and a second position so that the first optical head is transported from the optical head storing portion to the transport unit or from the transport unit to the optical head storing portion at the first position, and the second optical head is transported from the optical head storing portion to the transport unit or from the transport unit to the optical head storing portion at the second position.

15. The optical disc apparatus according to claim 14, recording and/or reproducing data on the optical disc placed on the disc rotation mechanism are performed when the transport unit is at the first position.

16. The optical disc apparatus according to claim 15, wherein the first optical head and the second optical head have objective lenses respectively, and a numerical aperture of the objective lens of the second optical head is larger than that of the objective lens of the first optical head.

17. The optical disc apparatus according to claim 15, wherein the optical head insertion and removal mechanism is provided to the transport unit, and the optical head insertion and removal mechanism and the optical head transport mechanism share a single driving source.

18. The optical disc apparatus according to claim 17, wherein each of the first and second optical heads has a transport rack having a tooth form of a tooth trace in a direction orthogonal to the direction guided by the guide structure, and each of the optical head insertion and removal mechanism and the optical head transport mechanism has an insertion gear and a transport gear capable of engaging with the transport rack of each optical head, and in the case where the transport unit and the optical head storing portion are at the positions capable of inserting or ejecting one of the plurality of optical heads stored in the optical head storing portion, the transport rack of the one optical head engages with the insertion gear and the one optical head is inserted into the transport unit from the optical head storing portion so that, in the transport unit, the transport rack of the one optical head engages with the transport gear so as to transport the one optical head along the guide structure.

19. The optical disc apparatus according to claim 18, further comprising a mechanism for absorbing a phase difference between the insertion gear and the transport gear.

20. The optical disc apparatus according to claim 18, wherein a rotation center of at least one of the insertion gear and transport gear swings to change a distance from the transport rack of the optical head, and the optical head insertion and removal mechanism or the optical head transport mechanism has a gear forcing mechanism for, of the insertion gear and transport gear, forcing the gear of which rotation center swings to the transport rack side.

21. The optical disc apparatus according to claim 20, wherein the insertion gear swings in conjunction with a transport unit elevator.

22. The optical disc apparatus according to claim 20, wherein the optical head insertion and removal mechanism or the optical head transport mechanism has a preliminary gear for driving the swinging gear, and the swinging gear swings by using the rotation center of the preliminary gear as a spindle.

23. The optical disc apparatus according to claim 22, further comprising an engagement avoiding mechanism in which, when the second optical head is inserted into the transport unit, the transport unit swings the insertion gear at the first position so as not to engage the transport rack of the first optical head stored in the optical head storing portion with the insertion gear.

24. The optical disc apparatus according to claim 23, wherein the optical head insertion and removal mechanism has an forcing portion for swinging the insertion gear, and the engagement avoiding mechanism has an engagement avoiding lever for forcing the forcing portion of the optical head insertion and removal mechanism in the case where the second optical head does not exist in the optical head storing portion and contacting the second optical head in the case where the second optical head is in the optical head storing portion so as to move the forcing portion of the optical head insertion and removal mechanism without forcing it.

25. The optical disc apparatus according to claim 14, wherein the guide structure, the first storage support guide and second storage support guide are pairs of parallel shafts placed with equal space respectively so that the shaft of the guide structure and the shaft of the first storage support guide, and the shaft of the guide structure and the shaft of the second storage support guide are placed to be linear at the first position and the second position respectively.

26. The optical disc apparatus according to claim 25, wherein the first optical head and the second optical head have a pair of guide receiving portions for engaging with the shafts, and lengths the pairs of shafts of the guide structure, the first storage support guide and second storage support guide are different so that, when the first optical head and the second optical head are transported from the first storage support guide or the second storage support guide to the guide configuration, one of the pair of guide receiving portions is supported by the first storage support guide or the second storage support guide until the other of the pair of guide receiving portions is completely moved to the guide structure.

27. The optical disc apparatus according to claim 13 wherein the second optical head has a portion for emitting the light beams formed in a convex portion, and the first optical head has a concave portion for receiving at least a part of the convex portion of the second optical head when the first optical head and the second optical head are stored in the optical head storing portion.

28. The optical disc apparatus according to claim 1, wherein at least one of the plurality of optical heads has an adapter having a guide receiving portion for engaging with the guide structure and an optical pickup placed on the adapter and having the guide receiving portion which does not engage with at least a part of the guide structure.

29. The optical disc apparatus according to claim 28, wherein the adapter has a mechanism for adjusting the position of the optical pickup against the adapter in order to adjust an optical axis of light beams emitted from the optical pickup.

30. The optical disc apparatus according to claim 29, wherein the optical pickup comprises a first projection and a pair of second projections, and the mechanism for adjusting the position of the optical pickup includes forcing springs for forcing each of the first projection and pair of second projections to the adapter and adjustment screws for pushing up the first projection and pair of second projections from the adapter against the forcing springs respectively.

31. The optical disc apparatus according to claim 29, wherein the optical pickup comprises a first projection and a pair of second projections, and the mechanism for adjusting the position of the optical pickup includes forcing springs for forcing each of the first projection and pair of second projections to the adapter, adjustment screws for pushing up the first projection and one of the pair of second projections from the adapter against the forcing springs respectively, and a convex portion positioned around in the middle of the pair of second projections and provided to the adapter to contact the bottom face of the optical pickup.

32. The optical disc apparatus according to claim 1, further comprising an optical headlock mechanism for preventing at least one of the plurality of optical heads stored in the optical head storing portion from moving from a corresponding storage support guide.

33. The optical disc apparatus according to claim 32, wherein the optical headlock mechanism independently prevents each of the plurality of optical heads from moving, and prevents all the optical heads from moving in the case where the transport unit and the optical head storing portion are at the positions for transporting no optical head.

* * * * *